(12) United States Patent
Takakubo et al.

(10) Patent No.: US 9,874,734 B2
(45) Date of Patent: Jan. 23, 2018

(54) ZOOM OPTICAL SYSTEM AND IMAGING APPARATUS PROVIDED WITH THE SAME

(71) Applicant: HOYA CORPORATION, Tokyo (JP)

(72) Inventors: Yutaka Takakubo, Saitama (JP); Eijiroh Tada, Saitama (JP)

(73) Assignee: HOYA CORPORATION, Tokyo (JP)

( * ) Notice: Subject to any disclaimer, the term of this patent is extended or adjusted under 35 U.S.C. 154(b) by 0 days.

(21) Appl. No.: 15/240,454

(22) Filed: Aug. 18, 2016

(65) Prior Publication Data

US 2017/0068078 A1 Mar. 9, 2017

(30) Foreign Application Priority Data

Sep. 8, 2015 (JP) ................. 2015-176831

(51) Int. Cl.
| | | |
|---|---|---|
| G02B 15/14 | (2006.01) | |
| G02B 9/00 | (2006.01) | |
| G02B 15/177 | (2006.01) | |
| G02B 13/00 | (2006.01) | |
| G02B 13/18 | (2006.01) | |
| G02B 9/34 | (2006.01) | |
| G02B 13/04 | (2006.01) | |
| G02B 15/24 | (2006.01) | |
| G02B 5/00 | (2006.01) | |

(52) U.S. Cl.
CPC ......... *G02B 15/177* (2013.01); *G02B 13/009* (2013.01); *G02B 13/0045* (2013.01); *G02B 13/0065* (2013.01); *G02B 5/005* (2013.01); *G02B 9/34* (2013.01); *G02B 13/004* (2013.01); *G02B 13/04* (2013.01); *G02B 13/18* (2013.01); *G02B 15/14* (2013.01); *G02B 15/24* (2013.01)

(58) Field of Classification Search
CPC ........ G02B 13/004; G02B 9/34; G02B 13/18; G02B 13/04; G02B 13/0045; G02B 15/177; G02B 5/005; G02B 13/009; G02B 15/14; G02B 13/0065; G02B 15/24

USPC ........ 359/686, 715, 726, 740, 753, 781, 783
See application file for complete search history.

(56) References Cited

U.S. PATENT DOCUMENTS

| | | | |
|---|---|---|---|
| 7,227,706 B2 * | 6/2007 | Yagyu | G02B 15/177 359/676 |
| 7,369,322 B2 * | 5/2008 | Souma | G02B 15/177 359/680 |

(Continued)

FOREIGN PATENT DOCUMENTS

| | | |
|---|---|---|
| JP | 2004-4533 | 1/2004 |
| JP | 2006-251529 | 9/2006 |

(Continued)

*Primary Examiner* — Evelyn A Lester
(74) *Attorney, Agent, or Firm* — Greenblum & Bernstein, P.L.C.

(57) ABSTRACT

A zoom optical system includes a negative first lens group having a first deflection optical element, a positive second lens group, a positive third lens group, a positive fourth lens group, and a second deflection optical element, in that order from the object side. The first lens group is provided at a fixed position relative to an imaging plane. Zooming is performed by moving at least the second and third lens groups so that distances between adjacent lens groups of the first through fourth lens groups change. The third lens group is a focusing lens group which moves along the optical axis during focusing. The following condition (1) is satisfied:

$$0.2 < f3/f4 < 1.0 \quad (1),$$

wherein f3 designates the focal length of the third lens group, and f4 designates the focal length of the fourth lens group.

20 Claims, 13 Drawing Sheets

(56) References Cited

U.S. PATENT DOCUMENTS

| | | | |
|---|---|---|---|
| 7,859,765 B2* | 12/2010 | Katakura | G02B 15/177 359/684 |
| 8,314,995 B2 | 11/2012 | Tada | |
| 8,427,757 B2* | 4/2013 | Katayose | G02B 15/173 359/686 |
| 9,429,767 B2 | 8/2016 | Takakubo | |
| 2003/0206352 A1 | 11/2003 | Mihara et al. | |
| 2005/0030405 A1 | 2/2005 | Morooka | |
| 2006/0066956 A1 | 3/2006 | Arai | |
| 2009/0002842 A1* | 1/2009 | Souma | G02B 15/177 359/684 |
| 2009/0067060 A1* | 3/2009 | Sudoh | G02B 9/62 359/683 |
| 2010/0165480 A1* | 7/2010 | Yamaguchi | G02B 15/177 359/686 |
| 2012/0120501 A1* | 5/2012 | Katayose | G02B 15/177 359/686 |
| 2012/0200746 A1 | 8/2012 | Suzuki | |
| 2012/0327276 A1* | 12/2012 | Ono | G02B 13/0065 348/240.3 |

FOREIGN PATENT DOCUMENTS

| | | |
|---|---|---|
| JP | 2008-8978 | 1/2008 |
| JP | 2008-96661 | 4/2008 |
| JP | 2010-44395 | 2/2010 |
| JP | 2010-49263 | 3/2010 |
| JP | 2012-163855 | 8/2012 |

* cited by examiner

FNO.=1:2.73

-0.05  0.05
SPHERICAL
ABERRATION
CHROMATIC
ABERRATION

Y=2.49mm

-0.05  0.05
ASTIGMATISM

Y=2.49mm

-20.0  20.0%
DISTORTION

——— d Line
------ g Line
— - — C Line

—— S
--- M

FNO.=1:3.64

Y=2.80mm

Y=2.80mm

—— d Line
- - - - g Line
— - — C Line

—— S
- - - M

-0.05  0.05
SPHERICAL
ABERRATION
CHROMATIC
ABERRATION

-0.05  0.05
ASTIGMATISM

-20.0  20.0%
DISTORTION

FNO.=1:4.88

Y=2.93mm

Y=2.93mm

—— d Line
- - - - g Line
— - — C Line

—— S
- - - M

-0.05  0.05
SPHERICAL
ABERRATION
CHROMATIC
ABERRATION

-0.05  0.05
ASTIGMATISM

-20.0  20.0%
DISTORTION

FNO.=1:2.06

— d Line
----- g Line
— — C Line

SPHERICAL
ABERRATION
CHROMATIC
ABERRATION

Y=3.03mm

— S
--- M

ASTIGMATISM

Y=3.03mm

DISTORTION

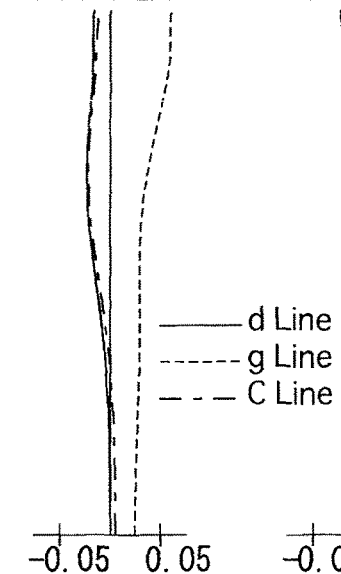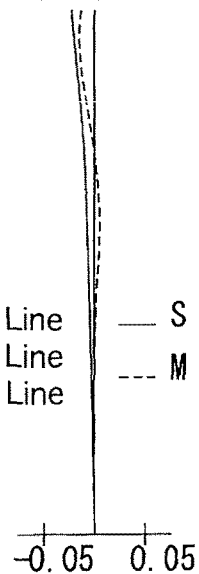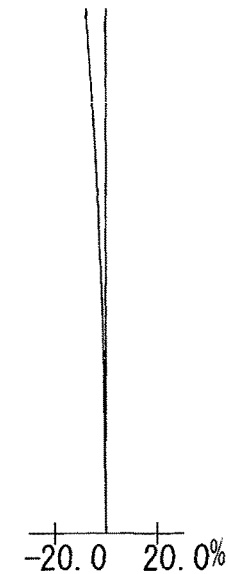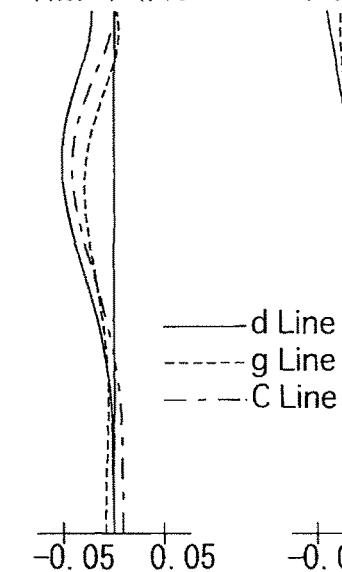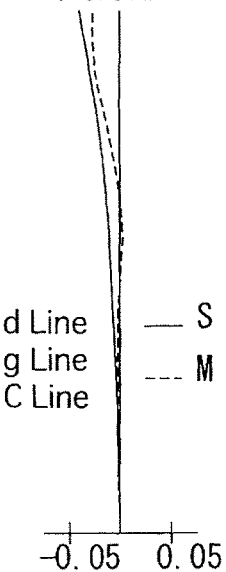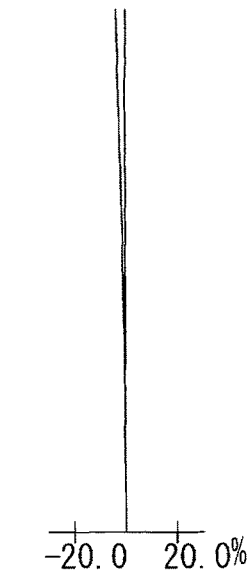

FNO.=1:2.73

-0.05    0.05
SPHERICAL
ABERRATION
CHROMATIC
ABERRATION

Y=1.89mm

—— d Line
----- g Line
— - — C Line
-0.05    0.05
ASTIGMATISM

Y=1.89mm

—— S
--- M
-20.0    20.0%
DISTORTION

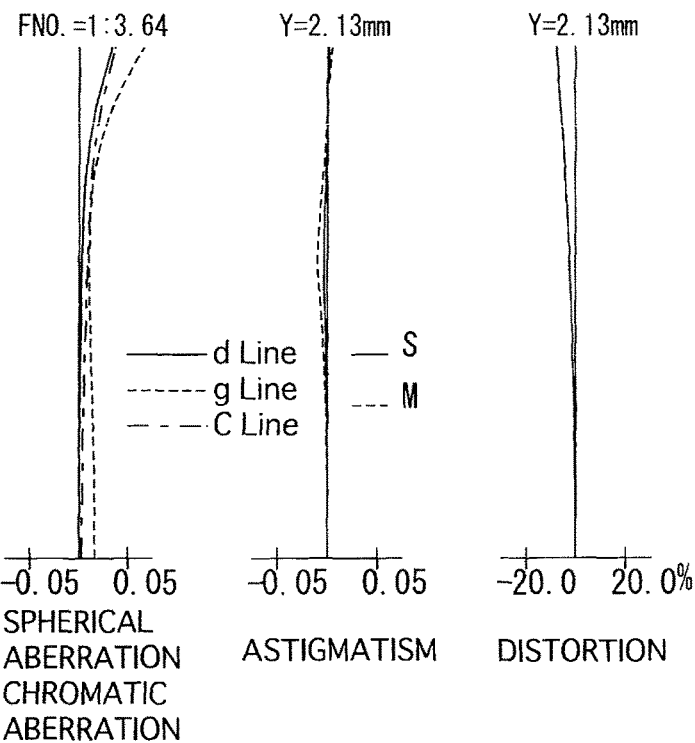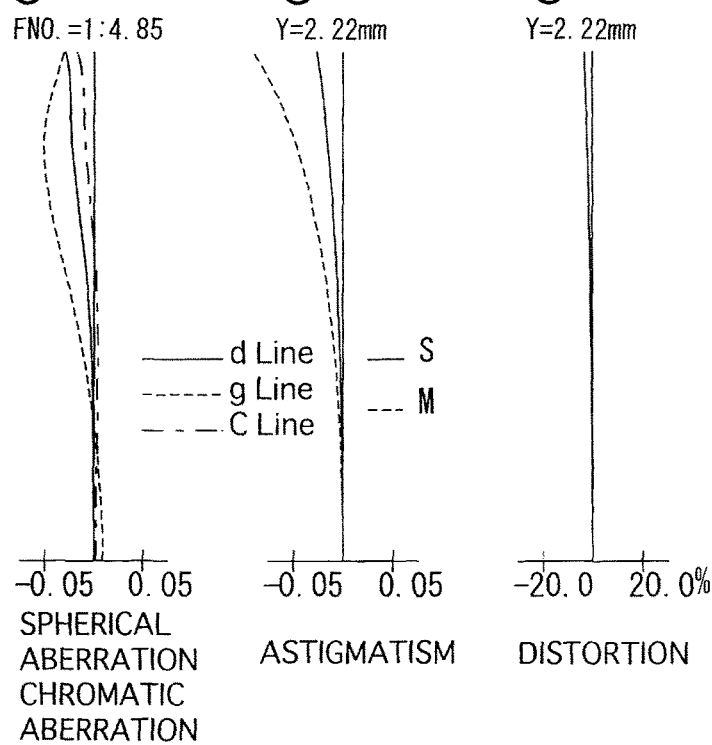

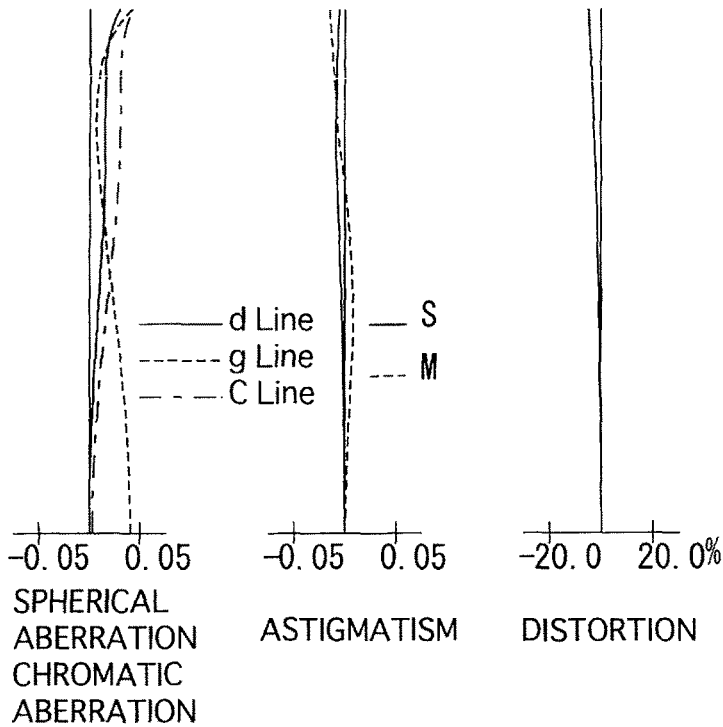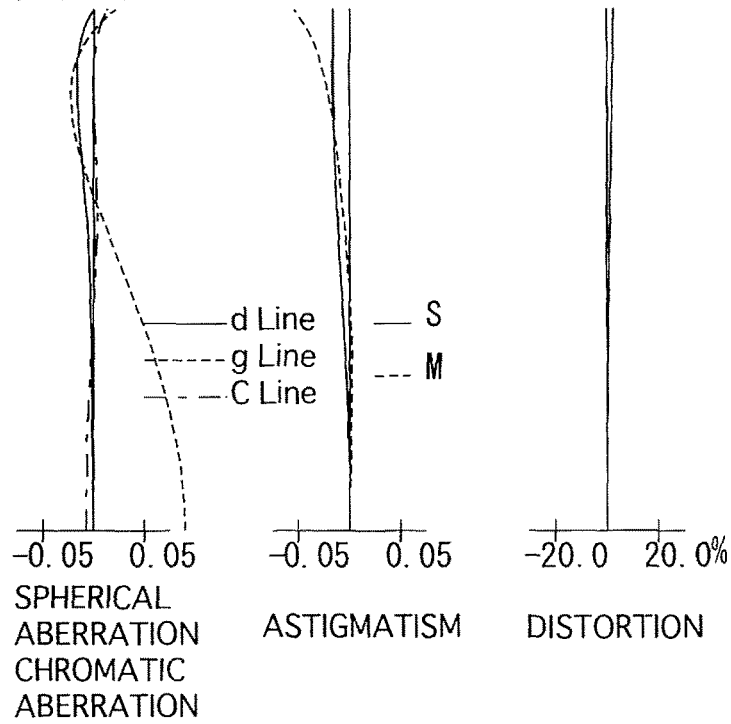

Fig.17
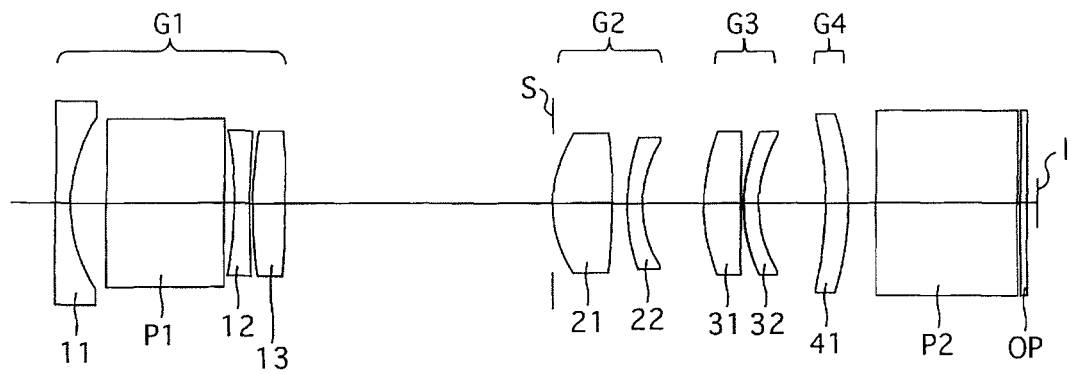
Fig.18A  Fig.18B  Fig.18C
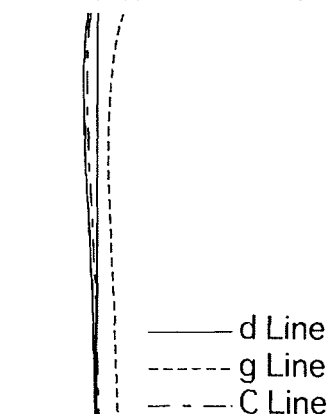
FNO.=1:2.74
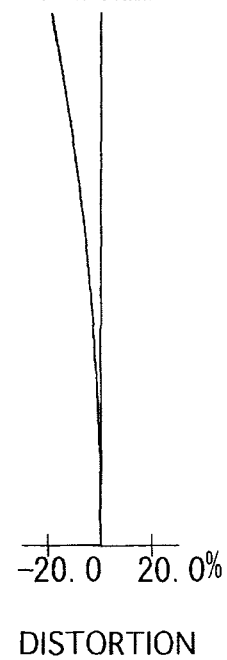
Y=2.46mm
Y=2.46mm
— d Line
----- g Line
— - — C Line
— S
--- M
-0.05  0.05
SPHERICAL
ABERRATION
CHROMATIC
ABERRATION
-0.05  0.05
ASTIGMATISM
-20.0  20.0%
DISTORTION

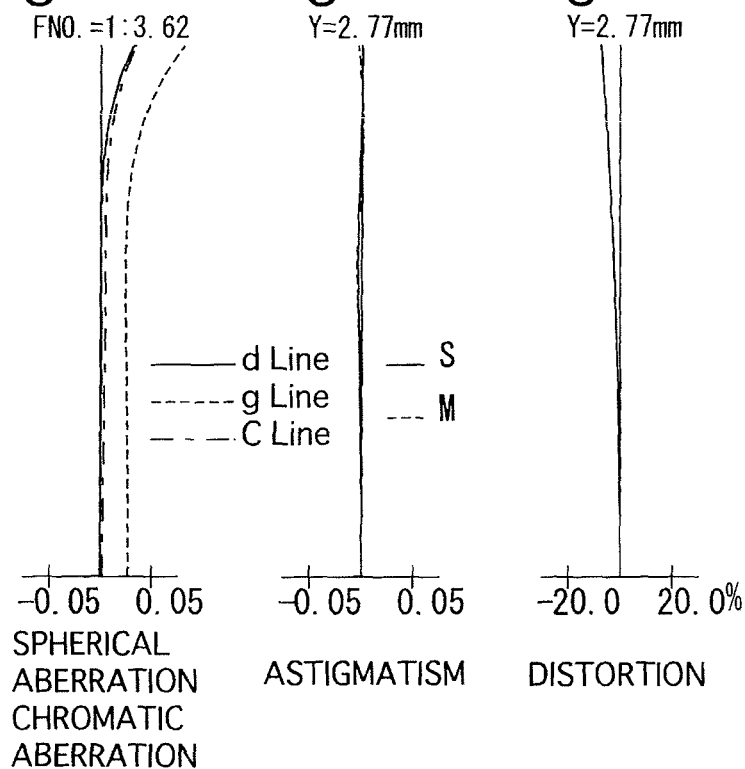
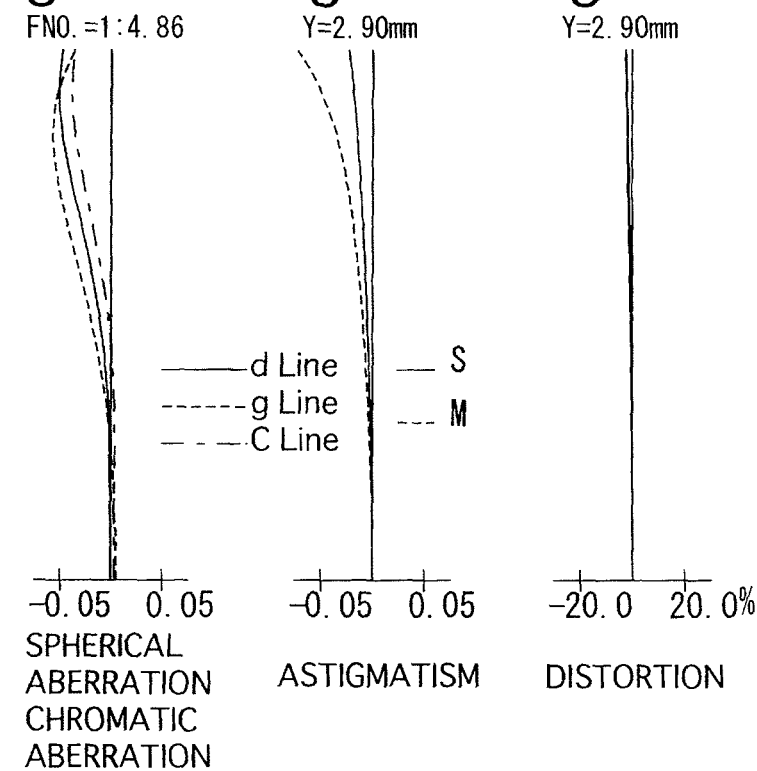

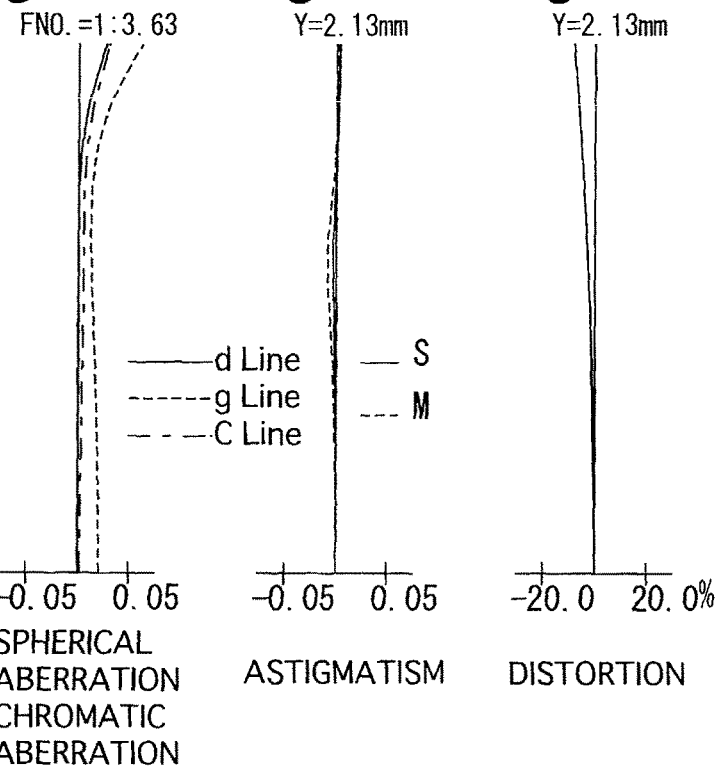
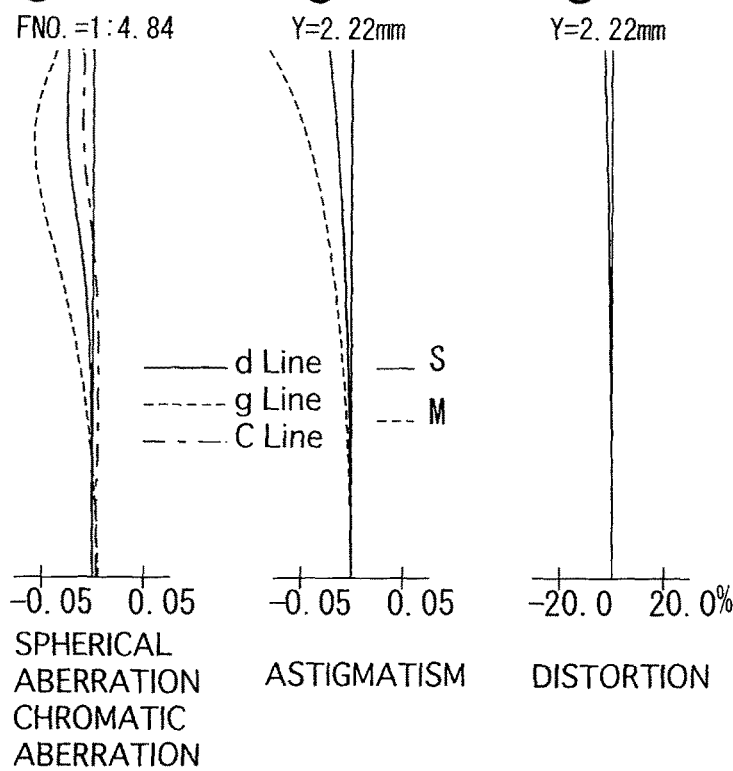

ZOOM OPTICAL SYSTEM AND IMAGING APPARATUS PROVIDED WITH THE SAME

BACKGROUND OF THE INVENTION

1. Field of the Invention

The present invention relates to a zoom optical system, and an imaging apparatus provided with such a zoom optical system.

2. Description of the Related Art

In recent years, mobile electronic devices, such as digital cameras (still-video cameras), mobile phones and smart devices (smart phones or tablet computers, etc.) which are equipped with a camera, have become widespread. There has been a desire to slim down the imaging apparatus, in which a camera is provided, in a depthwise direction with respect to object-emanating light rays that are incident thereon, and to miniaturize the imaging apparatus, in order to improve portability and freedom of design.

Accordingly, various types of zoom optical system have been proposed, in which a reflective optical member is provided for suppressing the "thickness" of the zoom optical system (i.e., the length of zoom optical system with respect to the forward/rearward direction of the mobile electronic device) in a depthwise direction with respect to object-emanating light rays that are incident thereon. For example, in each of Patent Literature Nos. 1 through 7, a zoom optical system provided with four lens groups (namely, a negative first lens group, a positive second lens group, a positive third lens group and a positive fourth lens group, in that order from the object side) is disclosed in which a slimming down in a depthwise direction thereof is achieved by providing a prism which is configured to bend the optical path.

Patent Literature No. 1: Japanese Unexamined Patent Publication No. 2012-163855
Patent Literature No. 2: Japanese Unexamined Patent Publication No. 2010-44395
Patent Literature No. 3: Japanese Unexamined Patent Publication No. 2008-8978
Patent Literature No. 4: Japanese Unexamined Patent Publication No. 2008-96661
Patent Literature No. 5: Japanese Unexamined Patent Publication No. 2006-251529
Patent Literature No. 6: Japanese Unexamined Patent Publication No. 2004-4533
Patent Literature No. 7: Japanese Unexamined Patent Publication No. 2010-49263

However, in each of the zoom optical systems of Patent Literature Nos. 1 through 7, there is a problem with the overall length of the zoom optical system being too long. For example, in each of the zoom optical systems of Patent Literature Nos. 1 through 7, a value equal to the overall length of the optical system divided by the maximum image height, at the long focal length extremity, is in the range of 12.4 through 19.0, which is a large value.

Furthermore, in each of the zoom optical systems of Patent Literature Nos. 1 through 7, the length of the prism along the optical axis is long, thereby causing the body (in which the zoom optical system is housed) to become thick in the depthwise direction (forward/rearward direction) thereof. For example, in each of the zoom optical systems of Patent Literature Nos. 1 through 7, a value equal to the length of the prism along the optical axis divided by the maximum image height, at the long focal length extremity, is in the range of 1.9 through 4.0, which is a large value.

SUMMARY OF THE INVENTION

The present invention has been devised in view of the above described problems, and the present invention provides a miniaturized and slimmed-down zoom optical system, and an imaging apparatus provided with such a zoom optical system.

According to an aspect of the present invention, a zoom optical system is provided, including a negative first lens group including a first deflection optical element, a positive second lens group, a positive third lens group, a positive fourth lens group, and a second deflection optical element, in that order from the object side. The first lens group, including the first deflection optical element, is provided at a fixed position relative to an imaging plane. Zooming is performed by moving at least the second lens group and the third lens group along the optical axis so that distances between adjacent lens groups of the first through fourth lens groups change. The third lens group is a focusing lens group which moves along the optical axis during focusing. The following condition (1) is satisfied:

$$0.2 < f3/f4 < 1.0 \tag{1}$$

wherein f3 designates the focal length of the third lens group, and f4 designates the focal length of the fourth lens group.

It is desirable for the second lens group to have two lens elements including at least one positive lens element, and wherein the following conditions (2) and (3) are satisfied:

$$4 < M2t/M2w < 10 \tag{2}$$

and $$vd2p > 60 \tag{3}$$

wherein M2t designates the lateral magnification of the second lens group at the long focal length extremity, M2w designates the lateral magnification of the second lens group at the short focal length extremity, and vd2p designates the Abbe number with respect to the d-line of a positive lens element provided closest to the object side within the second lens group.

It is desirable for the following condition (3') to be satisfied within the scope of condition (3):

$$100 > vd2p > 60 \tag{3'}$$

It is desirable for the second lens group to have a positive lens element and a negative lens element, wherein the following condition (4) is satisfied:

$$1 < |f2n|/f2 < 2 \tag{4}$$

wherein f2n designates the focal length of the negative lens element provided in the second lens group, and f2 designates the focal length of the second lens group.

It is desirable for the following condition (5) to be satisfied:

$$5 < f3/fw < 9 \tag{5}$$

wherein f3 designates the focal length of the third lens group, and fw designates the focal length of the entire zoom optical system at the short focal length extremity.

The second lens group can include a positive lens element and a negative lens element, wherein at least one of the positive lens element and the negative lens element includes an aspherical surface. For example, it is possible to form an aspherical surface on only the positive lens element of the second lens group, or form an aspherical surface on only the negative lens element of the second lens group, or form an aspherical surface on each of the positive lens element and the negative lens element of the second lens group.

It is desirable for the second lens group to include two lens elements, and for the following condition (6) to be satisfied:

$$-2.2 < f1/fw < -1.4 \qquad (6),$$

wherein f1 designates the focal length of the first lens group, and fw designates the focal length of the entire zoom optical system at the short focal length extremity.

It is desirable for the first lens group to include at least one negative lens element, and for the following condition (7) to be satisfied:

$$0.9 < fL1/f1 < 1.6 \qquad (7),$$

wherein fL1 designates the focal length of the negative lens element which is provided closest to the object side within the first lens group, and f1 designates the focal length of the first lens group.

It is desirable for the first deflection optical element to include a first prism, and for the following conditions (8) and (9) to be satisfied:

$$0.9 < Dp/fw < 1.8 \qquad (8),$$

and $$0.9 < Dp/Yt < 1.8 \qquad (9),$$

wherein Dp designates the length of the first prism along the optical axis, fw designates the focal length of the entire zoom optical system at the short focal length extremity, and Yt designates the maximum image height at the long focal length extremity.

It is desirable for the following condition (10) to be satisfied:

$$0.26 < f2/f3 < 0.47 \qquad (10),$$

wherein f2 designates the focal length of the second lens group, and f3 designates the focal length of the third lens group.

It is desirable for the third lens group to include a positive lens element and a negative lens element, wherein the following condition (11) is satisfied:

$$vd3p > 70 \qquad (11),$$

wherein vd3p designates the Abbe number with respect to the d-line of the positive lens element provided within the third lens group.

It is desirable for the following condition (11') to be satisfied within the scope of condition (11):

$$100 > vd3p > 70 \qquad (11').$$

It is desirable for the fourth lens group to be provided at a fixed position relative to an imaging plane, wherein the following condition (12) is satisfied:

$$6 < f4/fw < 24 \qquad (12),$$

wherein f4 designates the focal length of the fourth lens group, and fw designates the focal length of the entire zoom optical system at the short focal length extremity.

It is desirable for the second deflection optical element to be a second prism.

It is desirable for the fourth lens group to be a positive single lens element.

It is desirable for at least one of the first deflection optical element and the second deflection optical element to be a prism configured to bend an optical path by 90°.

In an embodiment, a zoom optical system is provided, including a negative first lens group including a first deflection optical element, a positive second lens group, a positive third lens group, and a positive fourth lens group, in that order from the object side. The first lens group, including the first deflection optical element, is provided at a fixed position relative to an imaging plane. Zooming is performed by moving at least the second lens group and the third lens group along the optical axis so that distances between adjacent lens groups of the first through fourth lens groups change. The second lens group includes two lens elements including at least one positive lens element, and wherein the following conditions (2) and (3) are satisfied:

$$4 < M2t/M2w < 10 \qquad (2),$$

and $$vd2p > 60 \qquad (3),$$

wherein M2t designates the lateral magnification of the second lens group at the long focal length extremity, M2w designates the lateral magnification of the second lens group at the short focal length extremity, and vd2p designates the Abbe number with respect to the d-line of a positive lens element provided closest to the object side within the second lens group.

It is desirable for the following condition (3') to be satisfied within the scope of condition (3):

$$100 > vd2p > 60 \qquad (3').$$

In an embodiment, a zoom optical system is provided, including a negative first lens group including a first deflection optical element, a positive second lens group, a positive third lens group, and a positive fourth lens group, in that order from the object side. The first lens group, including the first deflection optical element, is provided at a fixed position relative to an imaging plane. Zooming is performed by moving at least the second lens group and the third lens group along the optical axis so that distances between adjacent lens groups of the first through fourth lens groups change. The second lens group includes two lens elements, and wherein the following condition (6) is satisfied:

$$-2.2 < f1/fw < -1.4 \qquad (6),$$

wherein f1 designates the focal length of the first lens group, and fw designates the focal length of the entire zoom optical system at the short focal length extremity.

In an embodiment, an imaging apparatus is provided, including the above-described zoom optical system, and an image sensor configured to convert an image that is formed by the zoom optical system into electrical signals.

According to the present invention, a miniaturized and slimmed-down zoom optical system and an imaging apparatus provided with such a zoom optical system can be achieved.

The present disclosure relates to subject matter contained in Japanese Patent Application No. 2015-176831 (filed on Sep. 8, 2015) which is expressly incorporated herein by reference in its entirety.

BRIEF DESCRIPTION OF THE DRAWINGS

The present invention will be described below in detail with reference to the accompanying drawings in which:

FIGS. 7A, 7B and 7C show various aberrations that occurred in the zoom optical system, having the lens arrangement of FIG. 5, when focused on an object at infinity at an intermediate focal length;

FIGS. 8A, 8B and 8C show various aberrations that occurred in the zoom optical system, having the lens arrangement of FIG. 5, when focused on an object at infinity at the long focal length extremity;

FIGS. 11A, 11B and 11C show various aberrations that occurred in the zoom optical system, having the lens arrangement of FIG. 9, when focused on an object at infinity at an intermediate focal length;

FIGS. 12A, 12B and 12C show various aberrations that occurred in the zoom optical system, having the lens arrangement of FIG. 9, when focused on an object at infinity at the long focal length extremity;

FIGS. 15A, 15B and 15C show various aberrations that occurred in the zoom optical system, having the lens arrangement of FIG. 13, when focused on an object at infinity at an intermediate focal length;

FIGS. 16A, 16B and 16C show various aberrations that occurred in the zoom optical system, having the lens arrangement of FIG. 13, when focused on an object at infinity at the long focal length extremity;

FIG. 17 shows a lens arrangement of a fifth numerical embodiment of a zoom optical system according to the present invention, when focused on an object at infinity at the short focal length extremity;

FIGS. 18A, 18B and 18C show various aberrations that occurred in the zoom optical system, having the lens arrangement of FIG. 17, when focused on an object at infinity at the short focal length extremity;

FIGS. 19A, 19B and 19C show various aberrations that occurred in the zoom optical system, having the lens arrangement of FIG. 17, when focused on an object at infinity at an intermediate focal length;

FIGS. 20A, 20B and 20C show various aberrations that occurred in the zoom optical system, having the lens arrangement of FIG. 17, when focused on an object at infinity at the long focal length extremity;

FIGS. 23A, 23B and 23C show various aberrations that occurred in the zoom optical system, having the lens arrangement of FIG. 21, when focused on an object at infinity at an intermediate focal length;

FIGS. 24A, 24B and 24C show various aberrations that occurred in the zoom optical system, having the lens arrangement of FIG. 21, when focused on an object at infinity at the long focal length extremity.

DESCRIPTION OF THE PREFERRED EMBODIMENT

Figure 1:
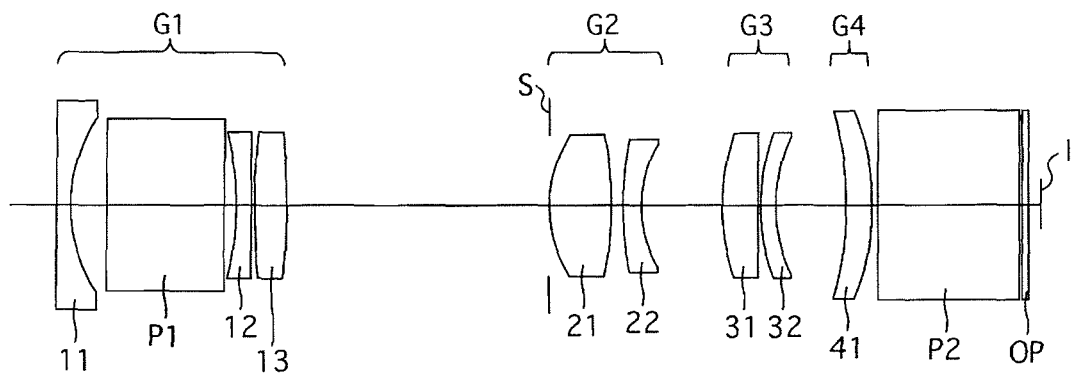
FIG. 1 shows a lens arrangement of a first numerical embodiment of a zoom optical system according to the present invention, when focused on an object at infinity at the short focal length extremity.
Figure 2A:
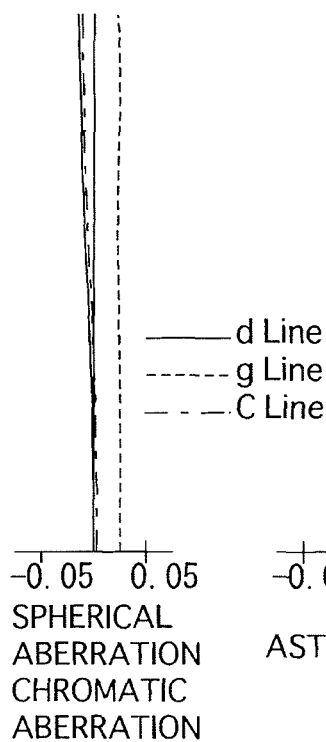
FIGS. 2A, 2B and 2C show various aberrations that occurred in the zoom optical system, having the lens arrangement of FIG. 1, when focused on an object at infinity at the short focal length extremity.
Figure 2B:
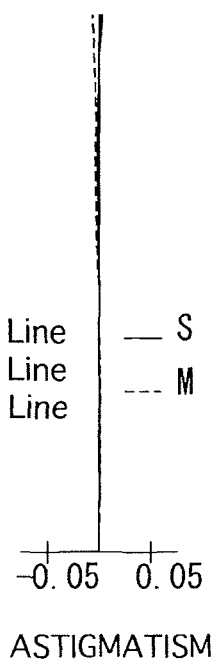
Figure 2C:
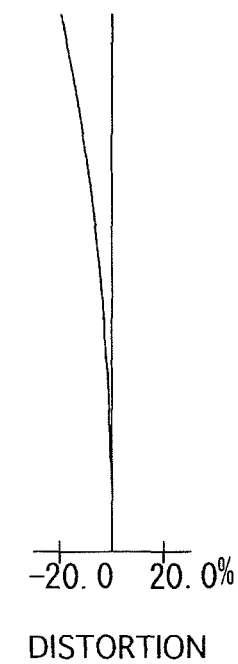
Figure 3A:
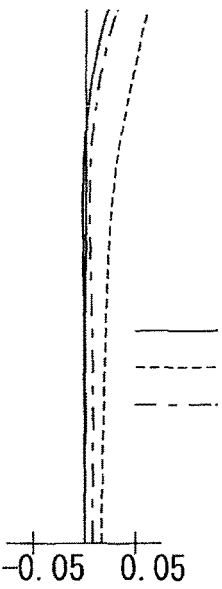
FIGS. 3A, 3B and 3C show various aberrations that occurred in the zoom optical system, having the lens arrangement of FIG. 1, when focused on an object at infinity at an intermediate focal length.
Figure 3B:
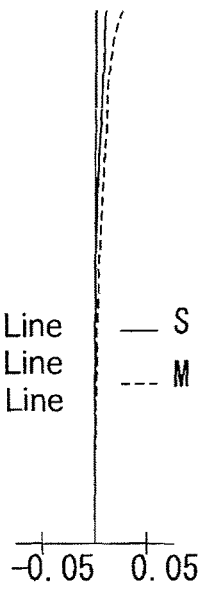
Figure 3C:
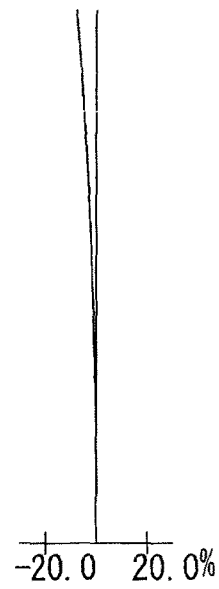

In each of the first through sixth numerical embodiments shown in FIGS. 1, 5, 9, 13, 17 and 21, respectively, the zoom optical system is configured of a negative first lens group G1 which includes a first prism (first deflection optical element) P1, a positive second lens group G2, a positive third lens group G3, a positive fourth lens group G4, and a second prism (second deflection optical element) P2, in that order from the object side. "I" designates an image surface (imaging surface/imaging plane) of an image sensor (not shown in the drawings).

Figure 25:
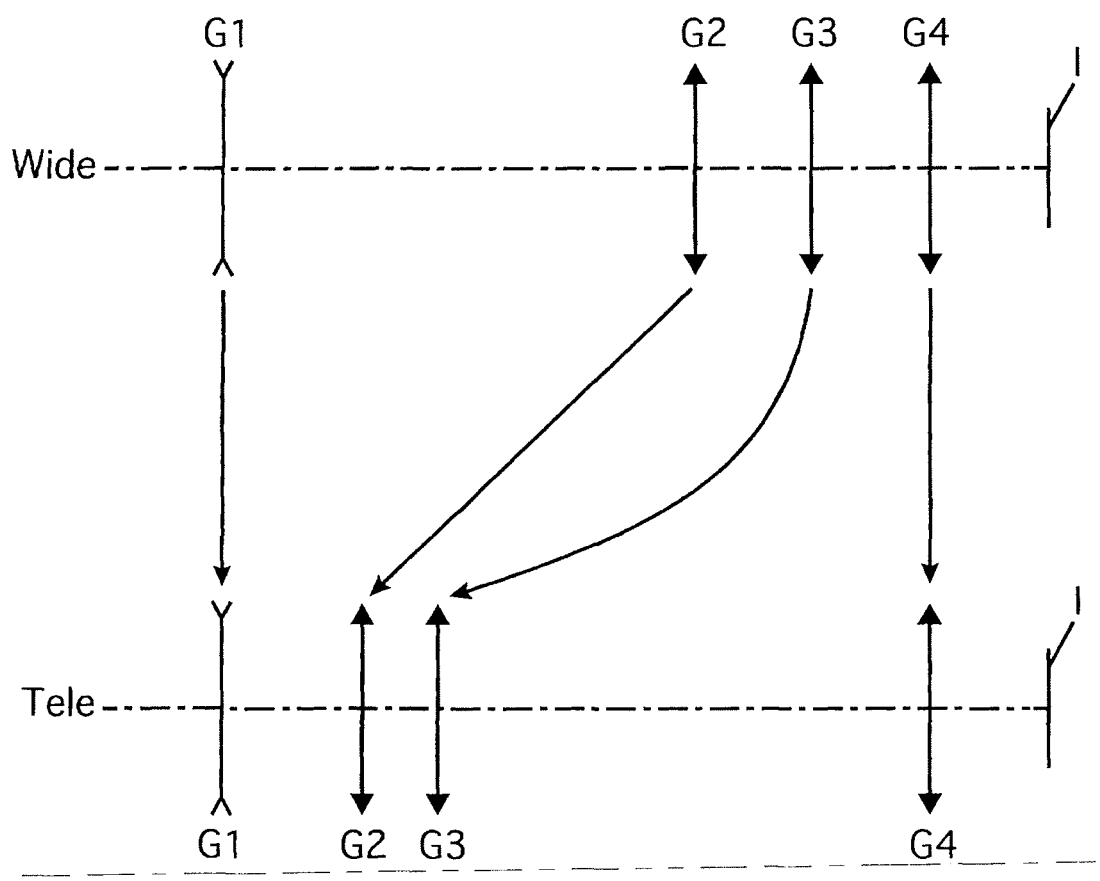
FIG. 25 shows a zoom path of the zoom lens system according to the present invention.

In each of the first through sixth numerical embodiments of the zoom optical system, as shown in FIG. 25, upon zooming from the short focal length extremity (Wide) to the long focal length extremity (Tele), the positions of the first lens group G1 and the fourth lens group G4 remain stationary (at a fixed position) relative to the image surface I (the first and fourth lens groups G1 and G4 do not move along the optical axis), and the second lens group G2 and the third lens group G3 move (advance) toward the object side by mutually different amounts. Accordingly, the distances between mutually adjacent lens groups of the first through fourth lens groups G1 through G4 change. Upon zooming from the short focal length extremity to the long focal length extremity, the second lens group G2 moves monotonically toward the object side, and the third lens group G3 moves toward the object side along a path in which the distance between the third lens group G3 and the second lens group G2 first increases, and thereafter decreases. Furthermore, although not shown in FIG. 25, upon zooming from the short focal length extremity to the long focal length extremity, the position of the second prism P2 remains stationary (at a fixed position) relative to the image surface I (does not move in the optical axis direction). Furthermore, although not shown in FIG. 25, a diaphragm S, which is arranged orthogonal to the optical axis and positioned at the close vicinity of the surface on the object side of the second lens group, moves integrally with the second lens group G2. In the second numerical embodiment, a light-bundle restricting member Sc, separate from the diaphragm S, is provided between the first lens group G1 and the second lens group G2 and can move along the optical axis direction independently of the first through fourth lens groups G1 through G4. Furthermore, upon zooming from the short focal length extremity to the long focal length extremity, an embodiment is possible in which the fourth lens group G4 also moves along the optical axis in addition to the second lens group G2 and the third lens group G3.

The third lens group G3 is a focusing lens group which moves along the optical axis direction during focusing. In other words, the third lens group G3 moves toward the object side upon focusing on an object at infinity to an object at a close distance.

In each of the first through sixth numerical embodiments, the first lens group G1 is configured of a negative lens element 11, a first prism P1, a negative lens element 12, and a positive lens element 13, in that order from the object side.

In each of the first, second, fourth and fifth numerical embodiments, the positive lens element 11 is provided with an aspherical surface on each side thereof. In each of the third and sixth numerical embodiments, the positive lens element 11 is provided with a spherical surface on each side thereof (not aspherical surfaces).

In each of the first through sixth numerical embodiments, the second lens group G2 is configured of a positive lens element 21 and a negative lens element 22, in that order from the object side. Each of the positive lens element 21 and the negative lens element 22 is provided with an aspherical surface on each respective side thereof.

In each of the first through sixth numerical embodiments, the third lens group G3 is configured of a positive lens element 31 and a negative lens element 32, in that order from the object side.

In the second numerical embodiment, the positive lens element 31 is provided with an aspherical surface on each side thereof. In each of the first, and third through sixth numerical embodiments, the positive lens element 31 is provided with a spherical surface on each side thereof (not aspherical surfaces).

In the fourth numerical embodiment, the positive lens element 31 and the negative lens element 32 are cemented to each other, whereas in the first through third, fifth and sixth numerical embodiments, the positive lens element 31 and the negative lens element 32 are not cemented to each other.

In each of the first through sixth numerical embodiments, the fourth lens group G4 is configured of a positive single lens element 41. The positive single lens element 41 is provided with an aspherical surface on each side thereof.

Although each of the first through sixth numerical embodiments utilizes a prism (first prisms P1 and P2) as a deflection optical member, it is possible to alternatively use a mirror.

Compared to each zoom optical system disclosed in the above-mentioned Patent Literature Nos. 1 through 7 of the related art, the zoom optical system of each illustrated embodiment has successfully reduced the overall length of the optical system and the length of the prism (first prism P1) along the optical axis. For example, in the zoom optical system of each illustrated embodiment, the value equal to the overall length of the optical system divided by the maximum image height, at the long focal length extremity, is within a range of 9.0 through 11.7 (whereas, an equivalent value of each of the above-mentioned Patent Literature Nos. 1 through 7 is within a range of 12.4 through 19.0); the smaller this value is, the shorter the overall length of the optical system is relative to the image height, formed by the optical system. Furthermore, in the zoom optical system of each illustrated embodiment, the value equal to the length of the prism (first prism P1) along the optical axis divided by the maximum image height, at the long focal length extremity, is within a range of 1.1 through 1.4 (whereas, an equivalent value of each of the above-mentioned Patent Literature Nos. 1 through 7 is within a range of 1.9 through 4.0); the smaller this value is, the shorter the length of the prism (first prism P1) along the optical axis is relative to the image height, formed by the optical system, thereby slimming down the depth (size in the forward/rearward direction) of the body in which the zoom optical system is housed.

Incidentally, the reason why the maximum image height at the long focal length extremity was used as a reference (the denominator for calculating the above-mentioned value) for assessing the overall length of the optical system and the length of the prism (first prism P1) along the optical axis, and not the maximum image height at the short focal length extremity, is explained hereinafter. Namely, correction of distortion at the short focal length extremity, which tends to cause an enlargement of the optical system, etc., cannot be sufficiently carried out optically, so that in recent years a method in which correction of such distortion is carried out via image processing performed with software. Since negative distortion still remains at the short focal length extremity of such an optical system that relies on software to correct distortion, the maximum image height at the short focal length extremity becomes smaller than the maximum image height at the long focal length extremity. Since the remaining amount of distortion differs depending on the design philosophy or objectives of the optical system, the maximum image height at the short focal length extremity differs depending on the optical system, and hence, the value of the maximum image height at the short focal length extremity is not suitable for comparing relative sizes with other optical systems. Whereas, distortion occurring in the optical system at the long focal length extremity is relatively small, and since either no image processing via software is carried out or only a small amount of correction is performed (if some image processing is carried out), the value of the maximum height at the long focal length extremity is suitable for comparing relative sizes with other optical systems.

The zoom optical system of each illustrated embodiment achieves the miniaturization and slimming down (in the forward/rearward direction of the imaging apparatus) thereof by providing the first prism P1 at the object side and the second prism P2 at the image side. Providing the second prism P2 at the image side can especially contribute to the avoidance of adverse influence on the thickness of the imaging apparatus caused by the image sensor and the electronic circuit board of the image sensor (both not shown in the drawings).

Condition (1) specifies the ratio of the focal length of the third lens group G3 to the focal length of the fourth lens group G4. By satisfying condition (1), fluctuations in aberrations that occur when the third lens group G3 is moved during focusing can be suppressed, while a sufficient space (distance) between the fourth lens group G4 and the image surface I for the second prism (second deflection optical element) P2 can be provided.

If the upper limit of condition (1) is exceeded, fluctuations in aberrations that occur when the third lens group G3 is moved during focusing increase.

If the lower limit of condition (1) is exceeded, a space (distance) between the fourth lens group G4 and the image surface I sufficient for providing the second prism P2 cannot be obtained.

In the zoom optical system of the illustrated embodiments, the second lens group G2 is configured of the positive lens element 21 and the negative lens element 22, thereby achieving a reduction in the overall length of the zoom optical system. Whereas, in the zoom optical system of, for example, each of aforementioned Patent Literature Nos. 1 through 6, since the second lens group is configured of three or four lens elements, the overall length of the zoom optical system becomes large.

Condition (2) specifies the ratio of the lateral magnification of the second lens group G2 at the long focal length extremity to the lateral magnification of the second lens group G2 at the short focal length extremity. By satisfying condition (2), various aberrations such as spherical aberration, etc., that occur in the second lens group G2 can be favorably corrected, while the overall length of the zoom optical system can be reduced.

If the upper limit of condition (2) is exceeded, it becomes difficult to correct various aberrations such as spherical aberration, etc., that occur in the second lens group G2.

If the lower limit of condition (2) is exceeded, the zooming burden increases on the third lens group G3, thereby increasing the movement amount of the third lens group G3 during zooming, thereby increasing the overall length of the zoom optical system.

Conditions (3) and (3') specify the Abbe number with respect to the d-line of the positive lens element 21, positioned closest to the object side within the second lens group G2. By satisfying condition (3), axial chromatic aberrations that occur in the second lens group G2 can be suppressed. Furthermore, by satisfying condition (3'), the entire zoom lens system can be further miniaturized.

If the lower limit of condition (3) or (3') is exceeded, axial chromatic aberrations that occur in the second lens group G2 increase.

If the upper limit of condition (3') is exceeded, out of existing optical materials, only a lens material having a low refractive index can be chosen for the positive lens element 21 (provided closest to the object side within the second lens group G2), thereby requiring the positive lens element 21 to have a large curvature (small radius of curvature), and causing the thickness of the positive lens element 21 to increase in order to obtain a sufficient thickness at the lens peripheral portion thereof. As a result, the entire zoom lens system would need to be enlarged.

Condition (4) specifies the ratio of the focal length of the negative lens element 22 provided within the second lens group G2 to the focal length of the second lens group G2. By satisfying condition (4), field curvature can be favorably corrected with the Petzval sum brought close to zero (0), while abaxial coma can be favorably corrected.

If the upper limit of condition (4) is exceeded, the Petzval sum becomes increasingly negative so that it becomes difficult to correct positive field curvature.

If the lower limit of condition (4) is exceeded, the radius of curvature of the negative lens element 22 provided within the second lens group G2 becomes small, so that abaxial coma increases.

Condition (5) specifies the ratio of the focal length of the third lens group G3 to the focal length of the entire zoom optical system at the short focal length extremity. By satisfying condition (5), the amount of movement of the third lens group G3 during zooming and during focusing can be suppressed, thereby achieving miniaturization of the zoom optical system while favorably correcting negative field curvature.

If the upper limit of condition (5) is exceeded, the refractive power of the third lens group G3 becomes too small, so that since the amount of movement of the third lens group G3 during zooming and focusing becomes too large, the zoom optical system enlarges.

If the lower limit of condition (5) is exceeded, the refractive power of the third lens group G3 becomes too large, so that it becomes difficult to correct negative field curvature.

In each illustrated embodiment of the zoom optical system, an aspherical surface is formed on each side of each of the positive lens element 21 and the negative lens element 22 of the second lens group G2. However, it is acceptable for only one side of each of the positive lens element 21 and the negative lens element 22 to have an aspherical surface formed thereon, or an aspherical surface(s) can be formed on only one of the positive lens element 21 and the negative lens element 22. Hence, even with a large aperture, various aberrations such as spherical aberration, etc., can be easily corrected by forming an aspherical surface on at least one surface out of the positive lens element 21 and the negative lens element 22 of the second lens group G2.

Condition (6) specifies the ratio of the focal length of the first lens group G1, to the focal length of the entire zoom optical system at the short focal length extremity. By satisfying condition (6), the size of the first deflection optical element (e.g., the first prism P1, or alternatively, a first mirror) can be reduced, a large angle-of-view at the short focal length extremity can be achieved, and distortion at the short focal length extremity can be favorably corrected. Since the first deflection optical element constitutes part of a bending optical system, which constitutes the zoom optical system, a reduction in the size of the deflection optical element results in a reduction in the thickness of the zoom optical system, and hence, the thickness of the body of the imaging apparatus.

If the upper limit of condition (6) is exceeded, it becomes difficult to correct distortion at the short focal length extremity.

If the lower limit of condition (6) is exceeded, the diameter of the effective optical light bundle at the first deflection optical element (on the reflection surface thereof) becomes large, thereby increasing the size of the first deflection optical element, and hence, increasing the thickness of the body of the imaging apparatus, and it becomes difficult to provide a large angle-of-view at the short focal length extremity.

Condition (7) specifies the ratio of the focal length of the negative lens element 11 positioned closest to the object side within the first lens group G1 to the focal length of the first lens group G1. By satisfying condition (7), the size of the first deflection optical element can be reduced, and distortion at the short focal length extremity can be favorably corrected.

If the upper limit of condition (7) is exceeded, the diameter of the effective optical light bundle at the first deflection optical element (on the reflection surface thereof) becomes large, thereby increasing the size of the first deflection optical element, and hence, increasing the thickness of the body of the imaging apparatus.

If the lower limit of condition (7) is exceeded, correction of distortion at the short focal length extremity becomes difficult.

Condition (8) specifies the ratio of the length of the first prism P1 along the optical axis to the focal length of the entire zoom optical system at the short focal length extremity. By satisfying condition (8), the thickness of the first prism P1 (and hence the thickness of the body of the imaging apparatus) can be reduced, and the amount of stray light emerging from the optical surface of first prism P1 can be reduced.

If the upper limit of condition (8) is exceeded, the thickness of the first prism P1 becomes large, thereby increasing the thickness of the bending optical system (zoom optical system), and hence, increasing the thickness of the body of the imaging apparatus.

If the lower limit of condition (8) is exceeded, the amount of stray light emerging from the optical surface of first prism P1 increases.

Condition (9) specifies the ratio of the length of the first prism P1 along the optical axis to the maximum image height at the long focal length extremity. By satisfying condition (9), the thickness of the first prism P1 (and hence the thickness of the body of the imaging apparatus) can be reduced, and the amount of stray light emerging from the optical surface of first prism P1 can be reduced.

If the upper limit of condition (9) is exceeded, the thickness of the first prism P1 becomes large, thereby increasing the thickness of the bending optical system (zoom optical system), and hence, increasing the thickness of the body of the imaging apparatus.

If the lower limit of condition (9) is exceeded, the amount of stray light emerging from the optical surface of first prism P1 increases.

Condition (10) specifies the ratio of the focal length of the second lens group G2 to the focal length of the third lens group G3. By satisfying condition (10), various aberrations such as spherical aberration, etc., that occur at the second lens group G2 can be favorably corrected, and the movement distances of the second lens group G2 and the third lens group G3 during zooming can be reduced.

If the upper limit of condition (10) is exceeded, the movement distances of the second lens group G2 and the third lens group G3 during zooming become large.

If the lower limit of condition (10) is exceeded, it becomes difficult to correct various aberrations such as spherical aberration, etc., that occur at the second lens group G2.

Conditions (11) and (11') specify the Abbe number with respect to the d-line of the positive lens element 31 within the third lens group G3. By satisfying condition (11), axial chromatic aberration and lateral chromatic aberration at the long focal length extremity can be favorably corrected. Furthermore, by satisfying condition (11'), the entire zoom lens system can be further miniaturized.

If the lower limit of conditions (11) or (11') is exceeded, increased amounts of axial chromatic aberration and lateral chromatic aberration at the long focal length extremity remain.

If the upper limit of condition (11') is exceeded, out of existing optical materials, only a lens material having a low refractive index can be chosen for the positive lens element 31 provided within the third lens group G3, thereby requiring the positive lens element 31 to have a large curvature (small radius of curvature), and causing the thickness of the positive lens element 31 to increase in order to obtain a sufficient thickness at the lens peripheral portion thereof. As a result, the entire zoom lens system would need to be enlarged.

Condition (12) specifies the ratio of the focal length of the fourth lens group G4 to the focal length of the entire zoom optical system at the short focal length extremity. By satisfying condition (12), a reduction in the overall length of the zoom optical system can be achieved, while obtaining a sufficient space (distance) between the fourth lens group G4 and the image surface I for providing the second prism (second deflection optical element) P2 therebetween.

If the upper limit of condition (12) is exceeded, the overall length of the zoom optical system increases.

If the lower limit of condition (12) is exceeded, a sufficient space (distance) between the fourth lens group G4 and the image surface I for providing the second prism P2 therebetween cannot be obtained.

Specific first through sixth numerical embodiments will be herein discussed. In the aberration diagrams and the tables, the d-line, g-line and C-line show aberrations at their respective wave-lengths; S designates the sagittal image, M designates the meridional image, f designates the focal length of the entire optical system, Fno. designates the f-number, W designates the half angle of view (°), Y designates the image height (the maximum image height), L designates the overall length of the lens system, fB designates the backfocus, r designates the radius of curvature, d designates the lens thickness or distance between lenses, N(d) designates the refractive index at the d-line, and vd designates the Abbe number with respect to the d-line. The unit used for the various lengths is defined in millimeters (mm). The values for the focal length, the f-number, the angle-of-view, the image height, the overall length of the lens system, the backfocus, and the distance d between lenses (which changes during zooming) are shown in the following order: short focal length extremity, intermediate focal length, and long focal length extremity.

An aspherical surface which is rotationally symmetrical about the optical axis is defined as:

$$x = cy^2/(1+[1-\{1+K\}c^2y^2]^{1/2}) + A4y^4 + A6y^6 + A8y^8 + A10y^{10} + A12y^{12} \ldots$$

wherein 'c' designates the curvature (1/r) of the aspherical vertex, 'y' designates the distance from the optical axis, 'K' designates the conic coefficient, A4 designates a fourth-order aspherical coefficient, A6 designates a sixth-order aspherical coefficient, A8 designates an eighth-order aspherical coefficient, A10 designates a tenth-order aspherical coefficient, A12 designates a twelfth-order aspherical coefficient, and 'x' designates the amount of sag.

Numerical Embodiment 1

Figure 4A:
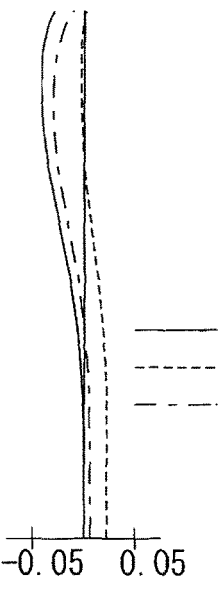
FIGS. 4A, 4B and 4C show various aberrations that occurred in the zoom optical system, having the lens arrangement of FIG. 1, when focused on an object at infinity at the long focal length extremity.
Figure 4B:
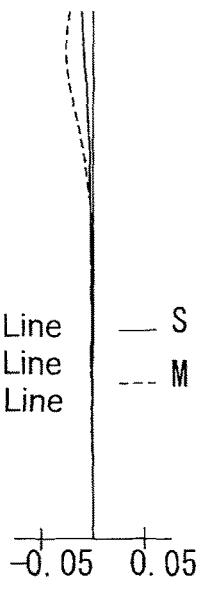
Figure 4C:
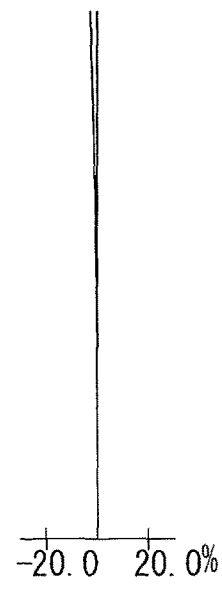

FIGS. 1 through 4C and Tables 1 through 4 show a first numerical embodiment of the zoom optical system of the present invention. FIG. 1 shows a lens arrangement of the first numerical embodiment of the zoom optical system, when focused on an object at infinity at the short focal length extremity. FIGS. 2A, 2B and 2C show various aberrations that occurred in the zoom optical system, having the lens arrangement of FIG. 1, when focused on an object at infinity at the short focal length extremity. FIGS. 3A, 3B and 3C show various aberrations that occurred in the zoom optical system, having the lens arrangement of FIG. 1, when focused on an object at infinity at an intermediate focal length. FIGS. 4A, 4B and 4C show various aberrations that occurred in the zoom optical system, having the lens arrangement of FIG. 1, when focused on an object at infinity at the long focal length extremity. Table 1 indicates the lens surface data, Table 2 indicates various lens-system data, Table 3 indicates the aspherical surface data, and Table 4 indicates the lens group data.

The zoom optical system of the first numerical embodiment is configured of a negative first lens group G1 which includes a first prism (first deflection optical element) P1, a positive second lens group G2, a positive third lens group G3, a positive fourth lens group G4, and a second prism (second deflection optical element) P2, in that order from the object side. The first prism P1 and the second prism P2 each constitute an element of a bending optical system which bends the optical path by 90°. A diaphragm S, which lies on a plane orthogonal to the optical axis and is tangent to the surface on the object side of the second lens group G2, moves integrally with the second lens group G2 along the optical axis during zooming. An optical filter OP is provided between the second prism P2 and the image surface I.

The first lens group G1 is configured of a negative meniscus lens element 11 having a convex surface on the object side, a first prism P1, a negative meniscus lens element 12 having a convex surface on the image side, and a biconvex positive lens element 13, in that order from the object side. The negative meniscus lens element 11 is provided with an aspherical surface on each side thereof.

The second lens group G2 is configured of a biconvex positive lens element 21, and a negative meniscus lens element 22 having a convex surface on the object side, in that order from the object side. Each of the biconvex positive lens element 21 and the negative meniscus lens element 22 has an aspherical surface on each side thereof.

The third lens group G3 is configured of a positive meniscus lens element 31 having a convex surface on the object side, and a negative meniscus lens element 32 having a convex surface on the object side, in that order from the object side.

The fourth lens group G4 is configured of a positive meniscus lens element 41 having a convex surface on the image side. The positive meniscus lens element 41 is provided with an aspherical surface on each side thereof.

TABLE 1

LENS SURFACE DATA

| Surf. No. | r | d | N(d) | νd |
|---|---|---|---|---|
| 1* | 148.000 | 0.500 | 1.77250 | 49.5 |
| 2* | 4.756 | 1.190 | | |
| 3 | ∞ | 3.900 | 2.00069 | 25.5 |
| 4 | ∞ | 0.390 | | |
| 5 | −9.564 | 0.500 | 1.77250 | 49.6 |
| 6 | −460.000 | 0.100 | | |
| 7 | 22.128 | 1.050 | 1.84666 | 23.8 |
| 8 | −22.128 | d8 | | |
| 9(Diaphragm) | ∞ | 0.000 | | |
| 10* | 3.873 | 2.060 | 1.49710 | 81.6 |
| 11* | −10.600 | 0.390 | | |
| 12* | 9.513 | 0.600 | 1.60641 | 27.2 |
| 13* | 3.984 | d13 | | |
| 14 | 7.020 | 1.160 | 1.43700 | 95.1 |
| 15 | 103.000 | 0.100 | | |
| 16 | 6.534 | 0.500 | 1.90366 | 31.3 |
| 17 | 5.100 | d17 | | |
| 18* | −11.770 | 0.840 | 1.54358 | 55.7 |
| 19* | −8.405 | 0.200 | | |
| 20 | ∞ | 4.600 | 1.91082 | 35.2 |
| 21 | ∞ | 0.100 | | |
| 22 | ∞ | 0.210 | 1.51680 | 64.2 |
| 23(Image Surf.) | ∞ | — | | |

The asterisk (*) designates an aspherical surface which is rotationally symmetrical with respect to the optical axis.

TABLE 2

LENS-SYSTEM DATA
Zoom Ratio: 2.872

| | Short Focal Length Extremity | Intermediate Focal Length | Long Focal Length Extremity |
|---|---|---|---|
| f | 3.893 | 6.600 | 11.180 |
| FNO. | 2.727 | 3.637 | 4.877 |
| W | 37.923 | 24.530 | 15.040 |
| Y | 2.492 | 2.797 | 2.931 |
| L | 32.374 | 32.374 | 32.374 |
| fB | 0.370 | 0.370 | 0.370 |
| d8 | 8.628 | 3.990 | 0.399 |
| d13 | 2.666 | 6.137 | 2.283 |
| d17 | 2.320 | 3.487 | 10.932 |

TABLE 3

ASPHERICAL SURFACE DATA

| Surf. No. | K | A4 | A6 | A8 |
|---|---|---|---|---|
| 1 | 0.000 | −0.7750E−03 | 0.6104E−04 | −0.1134E−05 |
| 2 | 0.000 | −0.1121E−02 | 0.2268E−04 | 0.3900E−05 |
| 10 | −0.610 | 0.1375E−03 | −0.9000E−05 | −0.8290E−05 |
| 11 | −9.535 | −0.3100E−03 | −0.1277E−03 | 0.7574E−05 |
| 12 | 0.000 | −0.1396E−02 | −0.1373E−03 | 0.3250E−04 |
| 13 | 0.000 | 0.6957E−03 | 0.1288E−03 | 0.5244E−04 |
| 18 | 0.000 | 0.2093E−02 | −0.6227E−03 | 0.3788E−04 |
| 19 | 0.000 | 0.2582E−02 | −0.6435E−03 | 0.3504E−04 |

TABLE 4

LENS GROUP DATA

| Lens Group | 1$^{st}$ Surface | Focal Length |
|---|---|---|
| 1 | 1 | −6.762 |
| 2 | 10 | 8.919 |
| 3 | 14 | 33.004 |
| 4 | 18 | 49.714 |

Numerical Embodiment 2

Figure 5:
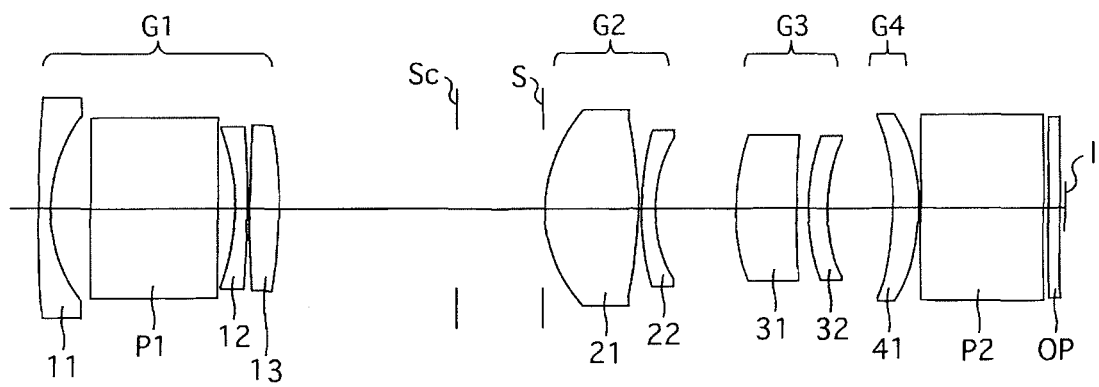
FIG. 5 shows a lens arrangement of a second numerical embodiment of a zoom optical system according to the present invention, when focused on an object at infinity at the short focal length extremity.
Figure 6A:
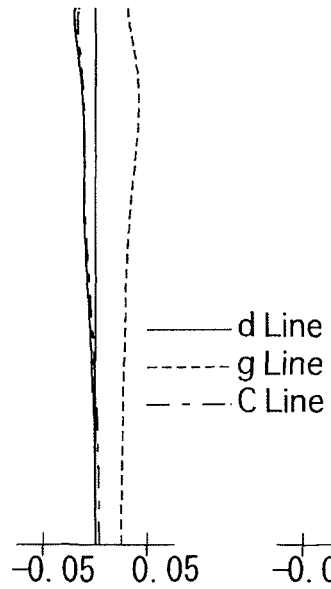
FIGS. 6A, 6B and 6C show various aberrations that occurred in the zoom optical system, having the lens arrangement of FIG. 5, when focused on an object at infinity at the short focal length extremity.
Figure 6B:
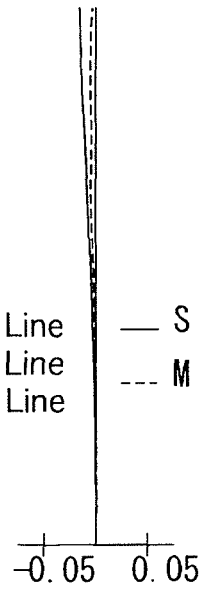
Figure 6C:
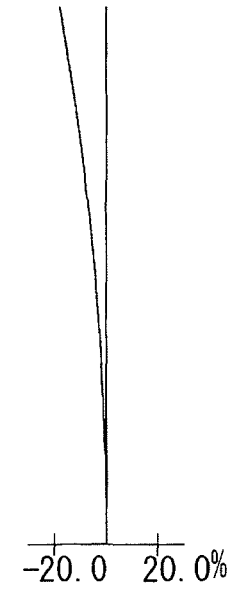

FIGS. 5 through 8C and Tables 5 through 8 show a second numerical embodiment of the zoom optical system of the present invention. FIG. 5 shows a lens arrangement of the second numerical embodiment of the zoom optical system, when focused on an object at infinity at the short focal length extremity. FIGS. 6A, 6B and 6C show various aberrations that occurred in the zoom optical system, having the lens arrangement of FIG. 5, when focused on an object at infinity at the short focal length extremity. FIGS. 7A, 7B and 7C show various aberrations that occurred in the zoom optical system, having the lens arrangement of FIG. 5, when focused on an object at infinity at an intermediate focal length. FIGS. 8A, 8B and 8C show various aberrations that occurred in the zoom optical system, having the lens arrangement of FIG. 5, when focused on an object at infinity at the long focal length extremity. Table 5 indicates the lens surface data, Table 6 indicates various lens-system data, Table 7 indicates the aspherical surface data, and Table 8 indicates the lens group data.

The lens arrangement of the second numerical embodiment is the same as that of the first numerical embodiment except for the following features:

(1) The positive meniscus lens element 31 of the third lens group G3 is provided with an aspherical surface on each side thereof.

(2) A light-bundle restricting member Sc is provided between the first lens group G1 and the second lens group G2 and can move along the optical axis direction independently from the first through fourth lens groups G1 through G4. The light-bundle restricting member Sc is used for improving the imaging performance around the peripheral image height by shielding off the peripheral edge of the light bundle that would otherwise cause coma to occur, with respect to the peripheral image height at mainly the short focal length extremity through to an intermediate focal length.

TABLE 5

LENS SURFACE DATA

| Surf. No. | r | d | N(d) | νd |
|---|---|---|---|---|
| 1* | 53.269 | 0.500 | 1.77250 | 49.5 |
| 2* | 5.919 | 1.647 | | |
| 3 | ∞ | 5.200 | 2.00069 | 25.5 |
| 4 | ∞ | 0.729 | | |
| 5 | −8.392 | 0.500 | 1.77250 | 49.6 |
| 6 | −41.208 | 0.100 | | |
| 7 | 57.770 | 1.210 | 1.84666 | 23.8 |
| 8 | −17.631 | d8 | | |
| 9 (Sc) | ∞ | d9 | | |
| 10(Diaphragm) | ∞ | 0.000 | | |
| 11* | 5.179 | 3.862 | 1.49710 | 81.6 |
| 12* | −14.816 | 0.134 | | |
| 13* | 11.371 | 0.564 | 1.82115 | 81.6 |
| 14* | 6.117 | d14 | | |
| 15* | 8.359 | 2.500 | 1.49710 | 81.6 |
| 16* | 38.866 | 0.503 | | |
| 17 | 8.405 | 0.788 | 1.90366 | 31.3 |
| 18 | 6.419 | d18 | | |
| 19* | −13.573 | 1.055 | 1.54358 | 55.7 |
| 20* | −9.020 | 0.100 | | |
| 21 | ∞ | 5.000 | 1.77250 | 49.6 |
| 22 | ∞ | 0.200 | | |
| 23 | ∞ | 0.445 | 1.51680 | 64.2 |
| 24(Image Surf.) | ∞ | — | | |

The asterisk (*) designates an aspherical surface which is rotationally symmetrical with respect to the optical axis.

TABLE 6

LENS-SYSTEM DATA
Zoom Ratio: 2.873

| | Short Focal Length Extremity | Intermediate Focal Length | Long Focal Length Extremity |
|---|---|---|---|
| f | 4.810 | 8.200 | 13.820 |
| FNO. | 2.056 | 2.889 | 4.150 |
| W | 37.131 | 23.891 | 14.732 |
| Y | 3.032 | 3.362 | 3.507 |
| L | 42.000 | 42.000 | 42.000 |
| fB | 0.001 | 0.001 | 0.001 |
| d8 | 7.307 | 3.286 | 0.400 |
| d9 | 3.654 | 1.643 | 0.200 |
| d14 | 3.283 | 6.966 | 2.947 |
| d18 | 2.719 | 5.068 | 13.416 |

TABLE 7

ASPHERICAL SURFACE DATA (Coefficients not shown are 0.00)

| Surf. No. | K | A4 | A6 | A8 |
|---|---|---|---|---|
| 1 | 0.000 | −0.2533E−03 | 0.1814E−04 | −0.2421E−06 |
| 2 | 0.000 | −0.4053E−03 | 0.7218E−05 | 0.7207E−06 |
| 10 | −0.463 | −0.4235E−05 | −0.4440E−05 | 0.2188E−07 |
| 11 | −4.360 | 0.1371E−03 | −0.4196E−05 | 0.1667E−06 |
| 12 | 0.000 | −0.3863E−03 | 0.5744E−04 | −0.2329E−05 |
| 13 | 0.000 | 0.3574E−03 | 0.9745E−04 | 0.5612E−06 |
| 14 | 0.000 | 0.1266E−03 | 0.1499E−05 | |
| 15 | 0.000 | 0.2785E−03 | 0.2511E−05 | |
| 18 | 0.000 | −0.3436E−04 | −0.1609E−03 | 0.6959E−05 |
| 19 | 0.000 | −0.9098E−04 | −0.1486E−03 | 0.6019E−05 |

TABLE 8

LENS GROUP DATA

| Lens Group | 1$^{st}$ Surface | Focal Length |
|---|---|---|
| 1 | 1 | −8.451 |
| 2 | 10 | 12.075 |
| 3 | 14 | 36.927 |
| 4 | 18 | 45.737 |

Numerical Embodiment 3

Figure 9:
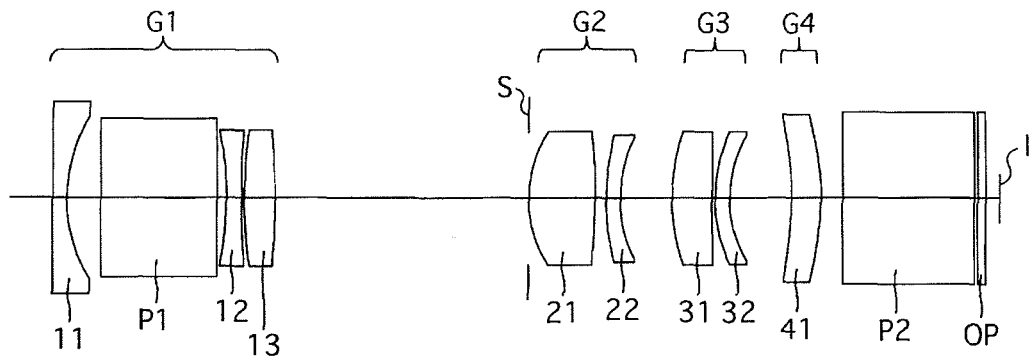
FIG. 9 shows a lens arrangement of a third numerical embodiment of a zoom optical system according to the present invention, when focused on an object at infinity at the short focal length extremity.
Figure 10A:
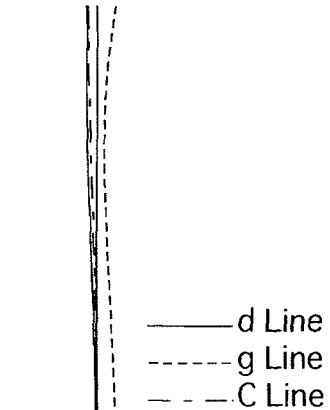
FIGS. 10A, 10B and 10C show various aberrations that occurred in the zoom optical system, having the lens arrangement of FIG. 9, when focused on an object at infinity at the short focal length extremity.
Figure 10B:
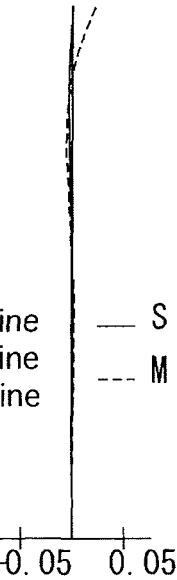
Figure 10C:
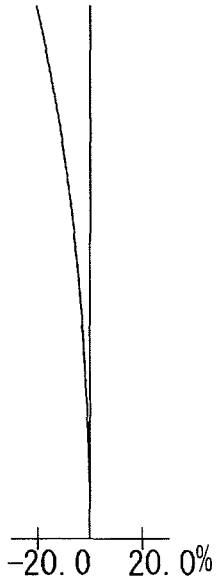

FIGS. 9 through 12C and Tables 9 through 12 show a third numerical embodiment of the zoom optical system of the present invention. FIG. 9 shows a lens arrangement of the third numerical embodiment of the zoom optical system, when focused on an object at infinity at the short focal length extremity. FIGS. 10A, 10B and 10C show various aberrations that occurred in the zoom optical system, having the lens arrangement of FIG. 9, when focused on an object at infinity at the short focal length extremity. FIGS. 11A, 11B and 11C show various aberrations that occurred in the zoom optical system, having the lens arrangement of FIG. 9, when focused on an object at infinity at an intermediate focal length. FIGS. 12A, 12B and 12C show various aberrations that occurred in the zoom optical system, having the lens arrangement of FIG. 9, when focused on an object at infinity at the long focal length extremity. Table 9 indicates the lens surface data, Table 10 indicates various lens-system data, Table 11 indicates the aspherical surface data, and Table 12 indicates the lens group data.

The lens arrangement of the third numerical embodiment is the same as that of the first numerical embodiment except for the following features:

(1) The negative lens element 11 of the first lens group G1 is a biconcave negative lens element having a spherical surface on each side thereof (rather than an aspherical surface).

(2) The negative lens element 12 of the first lens group G1 is a biconcave negative lens element.

TABLE 9

LENS SURFACE DATA

| Surf. No. | r | d | N(d) | νd |
|---|---|---|---|---|
| 1 | −7133.398 | 0.400 | 1.83481 | 42.7 |
| 2 | 4.083 | 0.940 | | |
| 3 | ∞ | 3.200 | 2.00069 | 25.5 |
| 4 | ∞ | 0.255 | | |

TABLE 9-continued

LENS SURFACE DATA

| Surf. No. | r | d | N(d) | νd |
|---|---|---|---|---|
| 5 | −9.160 | 0.400 | 1.77250 | 49.6 |
| 6 | 23.086 | 0.080 | | |
| 7 | 11.919 | 0.850 | 1.84666 | 23.8 |
| 8 | −18.746 | d8 | | |
| 9(Diaphragm) | ∞ | 0.000 | | |
| 10* | 3.223 | 1.831 | 1.49710 | 81.6 |
| 11* | −12.831 | 0.296 | | |
| 12* | 7.750 | 0.388 | 1.82115 | 81.6 |
| 13* | 4.171 | d13 | | |
| 14 | 5.346 | 1.098 | 1.49700 | 81.6 |
| 15 | 149.002 | 0.080 | | |
| 16 | 4.186 | 0.400 | 1.84666 | 23.8 |
| 17 | 3.308 | d17 | | |
| 18* | −8.662 | 0.800 | 1.54358 | 55.7 |
| 19* | −7.309 | 0.580 | | |
| 20 | ∞ | 3.570 | 1.77250 | 49.6 |
| 21 | ∞ | 0.100 | | |
| 22 | ∞ | 0.210 | 1.51680 | 64.2 |
| 23(Image Surf.) | ∞ | — | | |

The asterisk (*) designates an aspherical surface which is rotationally symmetrical with respect to the optical axis.

TABLE 10

LENS-SYSTEM DATA
Zoom Ratio: 2.894

| | Short Focal Length Extremity | Intermediate Focal Length | Long Focal Length Extremity |
|---|---|---|---|
| f | 3.000 | 5.200 | 8.681 |
| FNO. | 2.726 | 3.637 | 4.850 |
| W | 37.609 | 23.809 | 14.769 |
| Y | 1.886 | 2.130 | 2.221 |
| L | 25.935 | 25.935 | 25.935 |
| fB | 0.370 | 0.370 | 0.370 |
| d8 | 6.963 | 2.996 | 0.300 |
| d13 | 1.417 | 3.658 | 1.578 |
| d17 | 1.707 | 3.433 | 8.209 |

TABLE 11

ASPHERICAL SURFACE DATA

| Surf. No. | K | A4 | A6 | A8 |
|---|---|---|---|---|
| 10 | 0.000 | −0.1354E−02 | −0.2898E−05 | −0.3744E−05 |
| 11 | 0.000 | 0.4236E−02 | −0.5444E−03 | 0.1958E−04 |
| 12 | 0.000 | 0.6615E−02 | −0.9012E−03 | −0.1531E−03 |
| 13 | 0.000 | 0.8906E−02 | −0.4762E−04 | −0.1842E−03 |
| 18 | 0.000 | 0.2903E−02 | −0.4976E−03 | 0.5205E−04 |
| 19 | 0.000 | 0.2659E−02 | −0.5193E−03 | 0.4357E−04 |

TABLE 12

LENS GROUP DATA

| Lens Group | 1$^{st}$ Surface | Focal Length |
|---|---|---|
| 1 | 1 | −5.223 |
| 2 | 10 | 7.811 |
| 3 | 14 | 17.997 |
| 4 | 18 | 71.239 |

Numerical Embodiment 4

Figure 13:
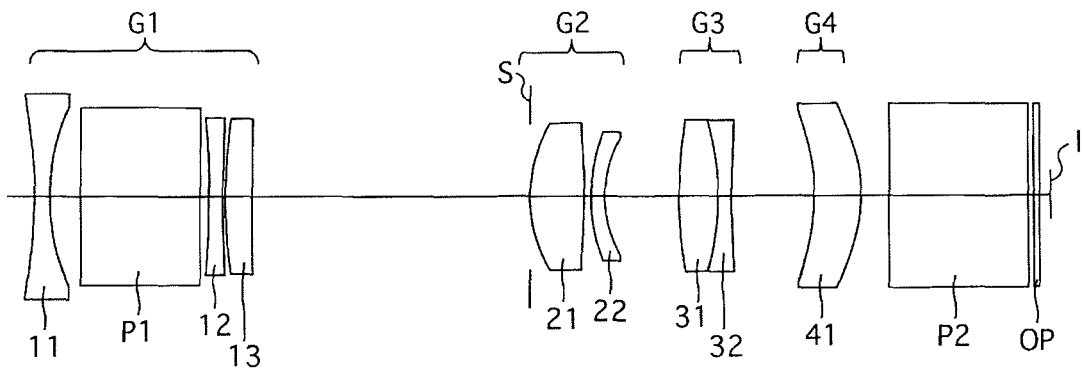
FIG. 13 shows a lens arrangement of a fourth numerical embodiment of a zoom optical system according to the present invention, when focused on an object at infinity at the short focal length extremity.
Figures 14A, 14B, 14C:
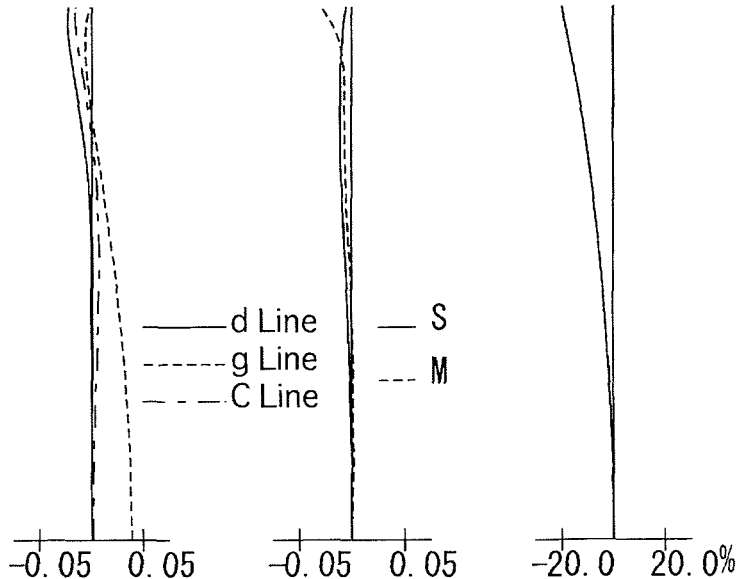
FIGS. 14A, 14B and 14C show various aberrations that occurred in the zoom optical system, having the lens arrangement of FIG. 13, when focused on an object at infinity at the short focal length extremity.

FIGS. 13 through 16C and Tables 13 through 16 show a fourth numerical embodiment of the zoom optical system of the present invention. FIG. 13 shows a lens arrangement of the fourth numerical embodiment of the zoom optical system, when focused on an object at infinity at the short focal length extremity. FIGS. 14A, 14B and 14C show various aberrations that occurred in the zoom optical system, having the lens arrangement of FIG. 13, when focused on an object at infinity at the short focal length extremity. FIGS. 15A, 15B and 15C show various aberrations that occurred in the zoom optical system, having the lens arrangement of FIG. 13, when focused on an object at infinity at an intermediate focal length. FIGS. 16A, 16B and 16C show various aberrations that occurred in the zoom optical system, having the lens arrangement of FIG. 13, when focused on an object at infinity at the long focal length extremity. Table 13 indicates the lens surface data, Table 14 indicates various lens-system data, Table 15 indicates the aspherical surface data, and Table 16 indicates the lens group data.

The lens arrangement of the fourth numerical embodiment is the same as that of the first numerical embodiment except for the following features:

(1) In the first lens group G1, the negative lens element 11 is a biconcave negative lens element, the negative lens element 12 is a biconcave negative lens element, and the positive lens element 13 is a positive meniscus lens element having a convex surface on the object side.

(2) In the third lens group G3, the positive lens element 31 is a biconvex positive lens element and the negative lens element 32 is a biconcave negative lens element; the biconvex positive lens element 31 and the biconcave negative lens element 32 are cemented to each other.

TABLE 13

LENS SURFACE DATA

| Surf. No. | r | d | N(d) | νd |
|---|---|---|---|---|
| 1* | −14.640 | 0.550 | 1.77250 | 49.5 |
| 2* | 9.015 | 1.074 | | |
| 3 | ∞ | 4.400 | 2.00069 | 25.5 |
| 4 | ∞ | 0.335 | | |
| 5 | −29.369 | 0.500 | 1.72916 | 54.7 |
| 6 | 57.573 | 0.100 | | |
| 7 | 19.552 | 0.980 | 1.94594 | 18.0 |
| 8 | 211.511 | d8 | | |
| 9(Diaphragm) | ∞ | 0.000 | | |
| 10* | 5.038 | 1.935 | 1.55332 | 71.7 |
| 11* | −19.550 | 0.254 | | |
| 12* | 6.624 | 0.500 | 1.82115 | 24.1 |
| 13* | 4.277 | d13 | | |
| 14 | 15.273 | 1.428 | 1.77250 | 49.6 |
| 15 | −9.650 | 0.500 | 1.69895 | 30.0 |
| 16 | 41.189 | d16 | | |
| 17* | −7.194 | 1.736 | 1.54358 | 55.7 |
| 18* | −5.160 | 1.003 | | |
| 19 | ∞ | 5.000 | 1.77250 | 49.6 |
| 20 | ∞ | 0.200 | | |
| 21 | ∞ | 0.210 | 1.51680 | 64.2 |
| 22(Image Surf.) | ∞ | — | | |

The asterisk (*) designates an aspherical surface which is rotationally symmetrical with respect to the optical axis.

TABLE 14

LENS-SYSTEM DATA
Zoom Ratio: 2.869

| | Short Focal Length Extremity | Intermediate Focal Length | Long Focal Length Extremity |
|---|---|---|---|
| f | 4.200 | 7.120 | 12.050 |
| FNO. | 2.453 | 3.213 | 4.351 |
| W | 37.006 | 23.783 | 14.453 |

TABLE 14-continued

LENS-SYSTEM DATA
Zoom Ratio: 2.869

|  | Short Focal Length Extremity | Intermediate Focal Length | Long Focal Length Extremity |
|---|---|---|---|
| Y | 2.587 | 2.995 | 3.183 |
| L | 37.000 | 37.000 | 37.000 |
| fB | 0.370 | 0.370 | 0.370 |
| d8 | 10.187 | 4.612 | 0.449 |
| d13 | 2.702 | 5.849 | 1.988 |
| d16 | 3.036 | 5.463 | 12.786 |

TABLE 15

ASPHERICAL SURFACE DATA

| Surf. No. | K | A4 | A6 | A8 |
|---|---|---|---|---|
| 1 | 0.000 | 0.7831E-03 | -0.2321E-04 | 0.6341E-06 |
| 2 | 0.000 | 0.6327E-03 | -0.1584E-04 | 0.1308E-05 |
| 10 | 0.000 | -0.6682E-03 | 0.4997E-04 | -0.8000E-06 |
| 11 | 0.000 | 0.1754E-02 | -0.8546E-04 | 0.1796E-05 |
| 12 | 0.000 | 0.2061E-02 | -0.1899E-03 | -0.1003E-04 |
| 13 | 0.000 | 0.1623E-02 | -0.9231E-04 | -0.1605E-04 |
| 17 | 0.000 | 0.6977E-03 | 0.2249E-04 | 0.2763E-05 |
| 18 | 0.000 | 0.2143E-02 | 0.3261E-05 | 0.3511E-05 |

TABLE 16

LENS GROUP DATA

| Lens Group | 1st Surface | Focal Length |
|---|---|---|
| 1 | 1 | -7.818 |
| 2 | 10 | 11.070 |
| 3 | 14 | 23.866 |
| 4 | 17 | 25.812 |

Numerical Embodiment 5

FIGS. 17 through 20C and Tables 17 through 20 show a fifth numerical embodiment of the zoom optical system of the present invention. FIG. 17 shows a lens arrangement of the fifth numerical embodiment of the zoom optical system, when focused on an object at infinity at the short focal length extremity. FIGS. 18A, 18B and 18C show various aberrations that occurred in the zoom optical system, having the lens arrangement of FIG. 17, when focused on an object at infinity at the short focal length extremity. FIGS. 19A, 19B and 19C show various aberrations that occurred in the zoom optical system, having the lens arrangement of FIG. 17, when focused on an object at infinity at an intermediate focal length. FIGS. 20A, 20B and 20C show various aberrations that occurred in the zoom optical system, having the lens arrangement of FIG. 17, when focused on an object at infinity at the long focal length extremity. Table 17 indicates the lens surface data, Table 18 indicates various lens-system data, Table 19 indicates the aspherical surface data, and Table 20 indicates the lens group data.

The lens arrangement of the fifth numerical embodiment is the same as that of the first numerical embodiment except for the following features:

(1) The negative lens element 12 of the first lens group G1 is a biconcave negative lens element.

(2) The positive lens element 31 of the third lens group G3 is a biconvex positive lens element.

TABLE 17

LENS SURFACE DATA

| Surf. No. | r | d | N(d) | vd |
|---|---|---|---|---|
| 1* | 444.816 | 0.500 | 1.77250 | 49.5 |
| 2* | 4.823 | 1.179 | | |
| 3 | ∞ | 3.900 | 2.00069 | 25.5 |
| 4 | ∞ | 0.335 | | |
| 5 | -11.977 | 0.500 | 1.77250 | 49.6 |
| 6 | 54.571 | 0.100 | | |
| 7 | 16.468 | 1.056 | 1.84666 | 23.8 |
| 8 | -30.224 | d8 | | |
| 9(Diaphragm) | ∞ | 0.000 | | |
| 10* | 3.966 | 1.979 | 1.49710 | 81.6 |
| 11* | -15.308 | 0.473 | | |
| 12* | 6.638 | 0.500 | 1.82115 | 24.1 |
| 13* | 3.947 | d13 | | |
| 14 | 6.550 | 1.221 | 1.43700 | 95.1 |
| 15 | -611.743 | 0.100 | | |
| 16 | 5.437 | 0.500 | 1.72342 | 38.0 |
| 17 | 4.335 | d17 | | |
| 18* | -10.514 | 0.750 | 1.54358 | 55.7 |
| 19* | -8.580 | 0.900 | | |
| 20 | ∞ | 4.600 | 1.77250 | 49.6 |
| 21 | ∞ | 0.100 | | |
| 22 | ∞ | 0.210 | 1.51680 | 64.2 |
| 23(Image Surf.) | ∞ | — | | |

The asterisk (*) designates an aspherical surface which is rotationally symmetrical with respect to the optical axis.

TABLE 18

LENS-SYSTEM DATA
Zoom Ratio: 2.874

|  | Short Focal Length Extremity | Intermediate Focal Length | Long Focal Length Extremity |
|---|---|---|---|
| f | 3.890 | 6.600 | 11.180 |
| FNO. | 2.744 | 3.621 | 4.858 |
| W | 37.392 | 24.243 | 14.860 |
| Y | 2.459 | 2.767 | 2.902 |
| L | 32.300 | 32.300 | 32.300 |
| fB | 0.370 | 0.370 | 0.370 |
| d8 | 8.801 | 3.962 | 0.400 |
| d13 | 2.023 | 4.772 | 2.045 |
| d17 | 2.203 | 4.29 | 10.581 |

TABLE 19

ASPHERICAL SURFACE DATA

| Surf. No. | K | A4 | A6 | A8 |
|---|---|---|---|---|
| 1 | 0.000 | -0.7570E-03 | 0.6491E-04 | -0.1367E-05 |
| 2 | 0.000 | -0.1049E-02 | 0.3016E-04 | 0.3267E-05 |
| 10 | 0.000 | -0.8877E-03 | -0.1047E-04 | -0.2251E-05 |
| 11 | 0.000 | 0.1564E-02 | -0.1186E-03 | 0.5728E-05 |
| 12 | 0.000 | 0.7919E-03 | -0.2000E-03 | -0.1415E-04 |
| 13 | 0.000 | 0.1644E-02 | -0.2635E-04 | -0.1405E-04 |
| 18 | 0.000 | 0.1355E-02 | -0.1824E-03 | 0.1200E-04 |
| 19 | 0.000 | 0.1463E-02 | -0.1831E-03 | 0.1010E-04 |

TABLE 20

LENS GROUP DATA

| Lens Group | 1st Surface | Focal Length |
|---|---|---|
| 1 | 1 | -6.801 |
| 2 | 10 | 9.782 |
| 3 | 14 | 22.221 |
| 4 | 18 | 75.524 |

Numerical Embodiment 6

Figure 21:
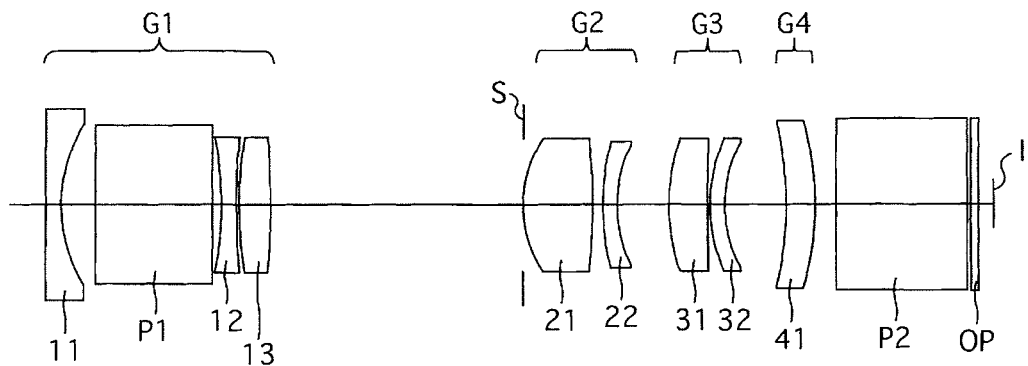
FIG. 21 shows a lens arrangement of a sixth numerical embodiment of a zoom optical system according to the present invention, when focused on an object at infinity at the short focal length extremity.
Figure 22A:
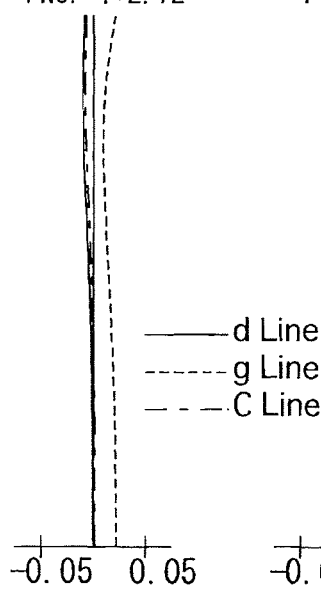
FIGS. 22A, 22B and 22C show various aberrations that occurred in the zoom optical system, having the lens arrangement of FIG. 21, when focused on an object at infinity at the short focal length extremity.
Figure 22B:
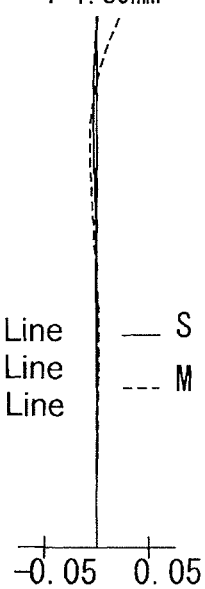
Figure 22C:
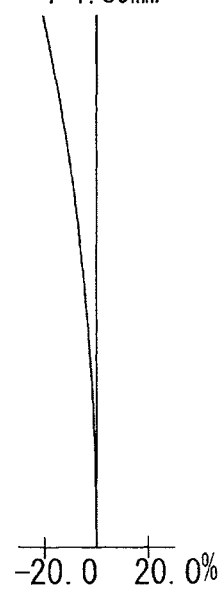

FIGS. 21 through 24C and Tables 21 through 24 show a sixth numerical embodiment of the zoom optical system of the present invention. FIG. 21 shows a lens arrangement of the sixth numerical embodiment of the zoom optical system, when focused on an object at infinity at the short focal length extremity. FIGS. 22A, 22B and 22C show various aberrations that occurred in the zoom optical system, having the lens arrangement of FIG. 21, when focused on an object at infinity at the short focal length extremity. FIGS. 23A, 23B and 23C show various aberrations that occurred in the zoom optical system, having the lens arrangement of FIG. 21, when focused on an object at infinity at an intermediate focal length. FIGS. 24A, 24B and 24C show various aberrations that occurred in the zoom optical system, having the lens arrangement of FIG. 21, when focused on an object at infinity at the long focal length extremity. Table 21 indicates the lens surface data, Table 22 indicates various lens-system data, Table 23 indicates the aspherical surface data, and Table 24 indicates the lens group data.

The lens arrangement of the sixth numerical embodiment is the same as that of the third numerical embodiment.

TABLE 21

LENS SURFACE DATA

| Surf. No. | r | d | N(d) | νd |
|---|---|---|---|---|
| 1 | −9684.459 | 0.400 | 1.83481 | 42.7 |
| 2 | 4.120 | 0.938 | | |
| 3 | ∞ | 3.200 | 2.00069 | 25.5 |
| 4 | ∞ | 0.255 | | |
| 5 | −9.152 | 0.400 | 1.77250 | 49.6 |
| 6 | 21.061 | 0.080 | | |
| 7 | 11.784 | 0.864 | 1.84666 | 23.8 |
| 8 | −18.263 | d8 | | |
| 9(Diaphragm) | ∞ | 0.000 | | |
| 10* | 3.190 | 1.900 | 1.49710 | 81.6 |
| 11* | −11.920 | 0.285 | | |
| 12* | 8.648 | 0.388 | 1.82115 | 24.1 |
| 13* | 4.313 | d13 | | |
| 14 | 5.512 | 1.067 | 1.55332 | 71.7 |
| 15 | 50.354 | 0.080 | | |
| 16 | 4.398 | 0.400 | 1.84666 | 23.8 |
| 17 | 3.457 | d17 | | |
| 18* | −8.265 | 0.800 | 1.54358 | 55.7 |
| 19* | −6.993 | 0.580 | | |
| 20 | ∞ | 3.570 | 1.77250 | 49.6 |
| 21 | ∞ | 0.100 | | |
| 22 | ∞ | 0.210 | 1.51680 | 64.2 |
| 23(Image Surf.) | ∞ | — | | |

The asterisk (*) designates an aspherical surface which is rotationally symmetrical with respect to the optical axis.

TABLE 22

LENS-SYSTEM DATA
Zoom Ratio: 2.894

| | Short Focal Length Extremity | Intermediate Focal Length | Long Focal Length Extremity |
|---|---|---|---|
| f | 3.000 | 5.200 | 8.681 |
| FNO. | 2.723 | 3.631 | 4.842 |
| W | 37.608 | 23.828 | 14.754 |
| Y | 1.886 | 2.130 | 2.221 |
| L | 25.941 | 25.941 | 25.941 |
| fB | 0.370 | 0.370 | 0.370 |
| d8 | 6.949 | 2.991 | 0.300 |
| d13 | 1.406 | 3.642 | 1.571 |
| d17 | 1.699 | 3.420 | 8.183 |

TABLE 23

ASPHERICAL SURFACE DATA

| Surf. No. | K | A4 | A6 | A8 |
|---|---|---|---|---|
| 10 | 0.000 | −0.1582E−02 | −0.7892E−05 | −0.1101E−04 |
| 11 | 0.000 | 0.4087E−02 | −0.5101E−03 | 0.1379E−04 |
| 12 | 0.000 | 0.6816E−02 | −0.8177E−03 | −0.1467E−03 |
| 13 | 0.000 | 0.9283E−02 | 0.7735E−04 | −0.1719E−03 |
| 18 | 0.000 | 0.2630E−02 | −0.5590E−03 | 0.5230E−04 |
| 19 | 0.000 | 0.2468E−02 | −0.5492E−03 | 0.4116E−04 |

TABLE 24

LENS GROUP DATA

| Lens Group | 1$^{st}$ Surface | Focal Length |
|---|---|---|
| 1 | 1 | −5.226 |
| 2 | 10 | 7.786 |
| 3 | 14 | 17.878 |
| 4 | 18 | 68.406 |

The numerical values of each condition for each numerical embodiment are shown in Table 25.

TABLE 25

| | Embod. 1 | Embod. 2 | Embod. 3 |
|---|---|---|---|
| Cond. (1) | 0.664 | 0.808 | 0.253 |
| Cond. (2) | 4.546 | 5.304 | 7.955 |
| Cond. (3) | 81.6 | 81.6 | 81.6 |
| Cond. (4) | 1.322 | 1.403 | 1.481 |
| Cond. (5) | 8.478 | 7.678 | 6.000 |
| Cond. (6) | −1.737 | −1.757 | −1.741 |
| Cond. (7) | 0.942 | 1.025 | 0.936 |
| Cond. (8) | 1.002 | 1.081 | 1.067 |
| Cond. (9) | 1.331 | 1.124 | 1.441 |
| Cond. (10) | 0.270 | 0.327 | 0.434 |
| Cond. (11) | 95.1 | 81.6 | 81.6 |
| Cond. (12) | 12.771 | 9.508 | 23.756 |

| | Embod. 4 | Embod. 5 | Embod. 6 |
|---|---|---|---|
| Cond. (1) | 0.925 | 0.294 | 0.261 |
| Cond. (2) | 9.716 | 8.353 | 8.027 |
| Cond. (3) | 71.7 | 81.6 | 81.6 |
| Cond. (4) | 1.469 | 1.323 | 1.402 |
| Cond. (5) | 5.683 | 5.712 | 5.959 |
| Cond. (6) | −1.862 | −1.749 | −1.742 |
| Cond. (7) | 0.914 | 0.928 | 0.944 |
| Cond. (8) | 1.048 | 1.003 | 1.067 |
| Cond. (9) | 1.382 | 1.344 | 1.441 |
| Cond. (10) | 0.464 | 0.440 | 0.435 |
| Cond. (11) | 49.6 | 95.1 | 71.7 |
| Cond. (12) | 6.147 | 19.409 | 22.801 |

As can be understood from FIG. 25, the first through third, fifth and sixth numerical embodiments satisfy conditions (1) through (12), and as shown in the various aberration diagrams, the various aberrations have been relatively well corrected. The fourth numerical embodiment satisfies each of conditions (1) through (10) and (12) (except condition (11)), and as shown in the various aberration diagrams, the various aberrations have been relatively well corrected, except for the large amount of axial chromatic aberration at the long focal length extremity.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A zoom optical system comprising a negative first lens group including a first deflection optical element, a positive second lens group, a positive third lens group, a positive fourth lens group, and a second deflection optical element, in that order from the object side, wherein said first lens group, including said first deflection optical element, is provided at a fixed position relative to an imaging plane, wherein zooming is performed by moving at least said second lens group and said third lens group along the optical axis so that distances between adjacent lens groups of the first through fourth lens groups change, wherein said third lens group is a focusing lens group which moves along the optical axis during focusing, and wherein the following condition (1) is satisfied:

$$0.2<f3/f4<1.0 \qquad (1),$$

wherein f3 designates the focal length of said third lens group, and f4 designates the focal length of said fourth lens group.

2. The zoom optical system according to claim 1, wherein said second lens group comprises two lens elements including at least one positive lens element, and wherein the following conditions (2) and (3) are satisfied:

$$4<M2t/M2w<10 \qquad (2),$$

and $$vd2p>60 \qquad (3),$$

wherein

M2t designates the lateral magnification of said second lens group at the long focal length extremity, M2w designates the lateral magnification of said second lens group at the short focal length extremity, and vd2p designates the Abbe number with respect to the d-line of a positive lens element provided closest to the object side within said second lens group.

3. The zoom optical system according to claim 2, wherein the following condition (3') is satisfied:

$$100>vd2p>60 \qquad (3').$$

4. The zoom optical system according to claim 1, wherein said second lens group comprises a positive lens element and a negative lens element, wherein the following condition (4) is satisfied:

$$1<|f2n|/f2<2 \qquad (4),$$

wherein f2n designates the focal length of the negative lens element provided in said second lens group, and f2 designates the focal length of said second lens group.

5. The zoom optical system according to claim 1, wherein the following condition (5) is satisfied:

$$5<f3/fw<9 \qquad (5),$$

wherein f3 designates the focal length of said third lens group, and fw designates the focal length of the entire zoom optical system at the short focal length extremity.

6. The zoom optical system according to claim 1, wherein said second lens group comprises a positive lens element and a negative lens element, wherein at least one of said positive lens element and said negative lens element includes an aspherical surface.

7. The zoom optical system according to claim 1, wherein said second lens group comprises two lens elements, and wherein the following condition (6) is satisfied:

$$-2.2<f1/fw<-1.4 \qquad (6),$$

wherein f1 designates the focal length of said first lens group, and fw designates the focal length of the entire zoom optical system at the short focal length extremity.

8. The zoom optical system according to claim 1, wherein said first lens group comprises at least one negative lens element, and wherein the following condition (7) is satisfied:

$$0.9<fL1/f1<1.6 \qquad (7),$$

wherein fL1 designates the focal length of the negative lens element which is provided closest to the object side within said first lens group, and f1 designates the focal length of said first lens group.

9. The zoom optical system according to claim 1, wherein said first deflection optical element comprises a first prism, and wherein the following conditions (8) and (9) are satisfied:

$$0.9<Dp/fw<1.8 \qquad (8),$$

and $$0.9<Dp/Yt<1.8 \qquad (9),$$

wherein

Dp designates the length of said first prism along the optical axis, fw designates the focal length of the entire zoom optical system at the short focal length extremity, and Yt designates the maximum image height at the long focal length extremity.

10. The zoom optical system according to claim 1, wherein the following condition (10) is satisfied:

$$0.26<f2/f3<0.47 \qquad (10),$$

wherein f2 designates the focal length of said second lens group, and f3 designates the focal length of said third lens group.

11. The zoom optical system according to claim 1, wherein the third lens group comprises a positive lens element and a negative lens element, wherein the following condition (11) is satisfied:

$$vd3p>70 \qquad (11),$$

wherein vd3p designates the Abbe number with respect to the d-line of the positive lens element provided within said third lens group.

12. The zoom optical system according to claim 11, wherein the following condition (11') is satisfied:

$$100>vd3p>70 \qquad (11').$$

13. The zoom optical system according to claim 1, wherein said fourth lens group is provided at a fixed position relative to an imaging plane, wherein the following condition (12) is satisfied:

$$6<f4/fw<24 \qquad (12),$$

wherein f4 designates the focal length of said fourth lens group, and fw designates the focal length of the entire zoom optical system at the short focal length extremity.

14. The zoom optical system according to claim 1, wherein said second deflection optical element comprises a second prism.

15. The zoom optical system according to claim 1, wherein said fourth lens group comprises a positive single lens element.

16. The zoom optical system according to claim 1, wherein at least one of said first deflection optical element and said second deflection optical element comprises a prism configured to bend an optical path by 90°.

17. A zoom optical system comprising a negative first lens group including a first deflection optical element, a positive second lens group, a positive third lens group, and a positive fourth lens group, in that order from the object side,
wherein said first lens group, including said first deflection optical element, is provided at a fixed position relative to an imaging plane,
wherein zooming is performed by moving at least said second lens group and said third lens group along the optical axis so that distances between adjacent lens groups of the first through fourth lens groups change,
wherein said second lens group includes two lens elements including at least one positive lens element, and wherein the following conditions (2) and (3) are satisfied:

$$4 < M2t/M2w < 10 \qquad (2),$$

and $$vd2p > 60 \qquad (3),$$

wherein
M2t designates the lateral magnification of said second lens group at the long focal length extremity,
M2w designates the lateral magnification of said second lens group at the short focal length extremity, and
vd2p designates the Abbe number with respect to the d-line of a positive lens element provided closest to the object side within said second lens group.

18. The zoom optical system according to claim 2, wherein the following condition (3') is satisfied:

$$100 > vd2p > 60 \qquad (3').$$

19. A zoom optical system comprising a negative first lens group including a first deflection optical element, a positive second lens group, a positive third lens group, and a positive fourth lens group, in that order from the object side,
wherein said first lens group, including said first deflection optical element, is provided at a fixed position relative to an imaging plane,
wherein zooming is performed by moving at least said second lens group and said third lens group along the optical axis so that distances between adjacent lens groups of the first through fourth lens groups change,
wherein said second lens group includes two lens elements, and wherein the following condition (6) is satisfied:

$$-2.2 < f1/fw < -1.4 \qquad (6),$$

wherein
f1 designates the focal length of said first lens group, and
fw designates the focal length of the entire zoom optical system at the short focal length extremity.

20. An imaging apparatus comprising:
a zoom optical system according to claim 1; and
an image sensor configured to convert an image that is formed by said zoom optical system into electrical signals.

* * * * *